United States Patent
Yamamoto et al.

(10) Patent No.: US 11,040,671 B2
(45) Date of Patent: Jun. 22, 2021

(54) IMAGING DEVICE

(71) Applicant: Hitachi Automotive Systems, Ltd., Hitachinaka (JP)

(72) Inventors: Kenji Yamamoto, Hitachinaka (JP); Hidenori Shinohara, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/324,762

(22) PCT Filed: Jul. 28, 2017

(86) PCT No.: PCT/JP2017/027364
§ 371 (c)(1),
(2) Date: Feb. 11, 2019

(87) PCT Pub. No.: WO2018/055906
PCT Pub. Date: Mar. 29, 2018

(65) Prior Publication Data
US 2019/0168688 A1 Jun. 6, 2019

(30) Foreign Application Priority Data
Sep. 21, 2016 (JP) .............................. JP2016-183671

(51) Int. Cl.
*B60R 11/04* (2006.01)
*G03B 17/56* (2021.01)
(Continued)

(52) U.S. Cl.
CPC .............. *B60R 11/04* (2013.01); *G03B 17/02* (2013.01); *G03B 17/56* (2013.01); *G03B 17/561* (2013.01);
(Continued)

(58) Field of Classification Search
CPC .... G03B 17/02; G03B 17/561; H04N 5/2257; B60R 11/04; B60R 2011/0026
See application file for complete search history.

(56) References Cited

U.S. PATENT DOCUMENTS 10,556,551 B2 * 2/2020 Krug ....................... B60R 11/04
2012/0207461 A1 8/2012 Okuda
(Continued)

FOREIGN PATENT DOCUMENTS

DE 10 2012 101 781 A1 9/2013
DE 11 2013 001 547 T5 2/2015
(Continued)

OTHER PUBLICATIONS

International Search Report (PCT/ISA/210) issued in PCT Application No. PCT/JP2017/027364 dated Nov. 21, 2017 with English translation (four (4) pages).
(Continued)

*Primary Examiner* — Minh Q Phan
(74) *Attorney, Agent, or Firm* — Crowell & Moring LLP

(57) ABSTRACT

The present invention provides an imaging device with which it is possible to easily mount/remove an imaging unit by a simpler operation than in the past when mounting/removing the imaging unit to and from a bracket, and to reduce more work space than in the past. In the present invention, an imaging unit 10 has a plurality of supported parts 15 that are supported by the bracket 20. The bracket 20 has a plurality of support structures 24 for supporting the plurality of supported parts 15. The support structures 24 have a receiving port 24a opened toward the rear of a mounting direction DF for receiving the supported parts 15 in the mounting direction DF and a support 24b for supporting the supported parts 15 on the forward side in the mounting direction DF of the receiving port 24a from a support direction DS that intersects the mounting direction DF.

11 Claims, 15 Drawing Sheets

(51) Int. Cl.
  *G03B 17/02* (2021.01)
  *H04N 5/225* (2006.01)
  *B60R 11/00* (2006.01)

(52) U.S. Cl.
  CPC ......... *H04N 5/2252* (2013.01); *H04N 5/2257* (2013.01); *B60R 2011/0026* (2013.01); *B60R 2011/0049* (2013.01)

(56) References Cited

U.S. PATENT DOCUMENTS

| | | |
|---|---|---|
| 2015/0030319 A1 | 1/2015 | Matori |
| 2015/0041510 A1 | 2/2015 | Frenzel et al. |
| 2017/0240120 A1 | 8/2017 | Krug et al. |
| 2018/0093620 A1 | 4/2018 | Okuda |

FOREIGN PATENT DOCUMENTS

| | | |
|---|---|---|
| DE | 10 2014 012 001 A1 | 2/2016 |
| JP | 2005-309098 A | 11/2005 |
| JP | 2012-166615 A | 9/2012 |
| JP | 2013-186278 A | 9/2013 |
| JP | 2013-207571 A | 10/2013 |
| JP | 2015-20695 A | 2/2015 |

OTHER PUBLICATIONS

Japanese-language Office Action issued in counterpart Japanese Application No. 2018-540668 dated Nov. 5, 2019 with English translation (six pages).
Extended European Search Report issued in European Application No. 17852687.7 dated Mar. 19, 2020 (six (6) pages).

\* cited by examiner

IMAGING DEVICE

TECHNICAL FIELD

The present invention relates to an imaging device.

BACKGROUND ART

Conventionally, there is known an invention related to a camera unit including a camera main body and a bracket that removably supports the camera main body to fix the camera main body to a mounting target such as a windshield of a vehicle (refer to, for example, PTL 1 below).

In the conventional camera unit described in PTL 1, the camera main body has a hook-shaped portion to be hooked on the bracket, and the bracket includes a first support that hooks the hook-shaped portion to turnably support the camera main body, and a second support that fixedly supports the main body (refer to the same PTL, Claim 1, or the like).

PTL 1 discloses capability of fixing the camera main body by the camera unit without sliding the camera main body and capability of improving the degree of freedom in design or achieving space saving in the camera unit (refer to the same PTL, Paragraph 0008 or the like).

CITATION LIST

Patent Literature

PTL 1: JP 2015-20695 A

SUMMARY OF INVENTION

Technical Problem

At the time of mounting the camera main body to the bracket in the conventional camera unit, there is a need to hook the hook-shaped portion of the camera main body to the first support of the bracket, turn the camera main body for positioning, and fix the camera main body to the bracket via the second support of the bracket.

In addition, at the removal of the camera main body from the bracket, there is a need to perform reversed operation of the operation of mounting the camera main body to the bracket. This would complicate the operation in mounting/removing the camera main body to/from the bracket. This not only results in problems of complicating the mounting/removal of the camera main body but also generates necessity to provide a large work space for turning the camera main body.

The present invention has been made in view of the above problem, and an object thereof is to provide an imaging device capable of easily mounting/removing an imaging unit by simpler operation than in the conventional technique when mounting/removing the imaging unit to and from a bracket, and to reduce more work space than in the conventional technique.

Solution to Problem

In order to achieve the above object, an imaging device of the present invention is an imaging device including an imaging unit and a bracket capable of mounting the imaging unit in a mounting direction, in which the imaging unit includes a plurality of supported parts supported by the bracket, the bracket includes a plurality of support structures for supporting the plurality of supported parts, and the support structure includes: a receiving port that opens toward the rear in the mounting direction to receive the supported part in the mounting direction; and a support for supporting the supported part on the forward side in the mounting direction of the receiving port from a support direction that intersects the mounting direction.

Advantageous Effects of Invention

At the time of mounting the imaging unit to the bracket in the imaging device of the present invention, sliding the imaging unit in a predetermined mounting direction causes the plurality of supported parts of the imaging unit to be received by the receiving port provided in each of the plurality of support structures of the bracket and that opens toward the rear in the mounting direction. Further sliding the imaging unit in the mounting direction causes the plurality of supported parts of the imaging unit to move to the forward side in the mounting direction of the receiving ports of the plurality of support structures, so as to allow the imaging unit to be supported by the support provided in each of the plurality of support structures from a support direction that intersects the mounting direction. With the above-described procedure, the imaging unit is mounted to the bracket.

Furthermore, at the removal of the imaging unit from the bracket in the imaging device of the present invention, sliding the imaging unit rearward in the mounting direction, that is, in a removing direction opposite to the mounting direction causes the plurality of supported parts of the imaging unit to move from the support of the plurality of support structures to the receiving port. Further sliding the imaging unit in a removing direction causes the plurality of supported parts of the imaging unit to move in the removing direction from the receiving ports of the plurality of support structures of the bracket, so as to release support of the plurality of supported parts of the imaging unit provided by the plurality of support structures of the bracket. With the above-described procedure, the imaging unit is removed from the bracket.

Therefore, according to the imaging device of the present invention, it is only necessary to slide the imaging unit in a predetermined mounting direction or its opposite direction at the time of mounting and removing the imaging unit to and from the bracket, making it possible to easily perform the mounting/removal of the imaging unit with simpler operation than the conventional technique. In addition, there is no need to turn the imaging unit, making it possible to reduce the work space as compared with the conventional technique.

DESCRIPTION OF EMBODIMENTS

Embodiments of an imaging device according to the present invention will be described below with reference to the drawings.

First Embodiment

Figure 1:
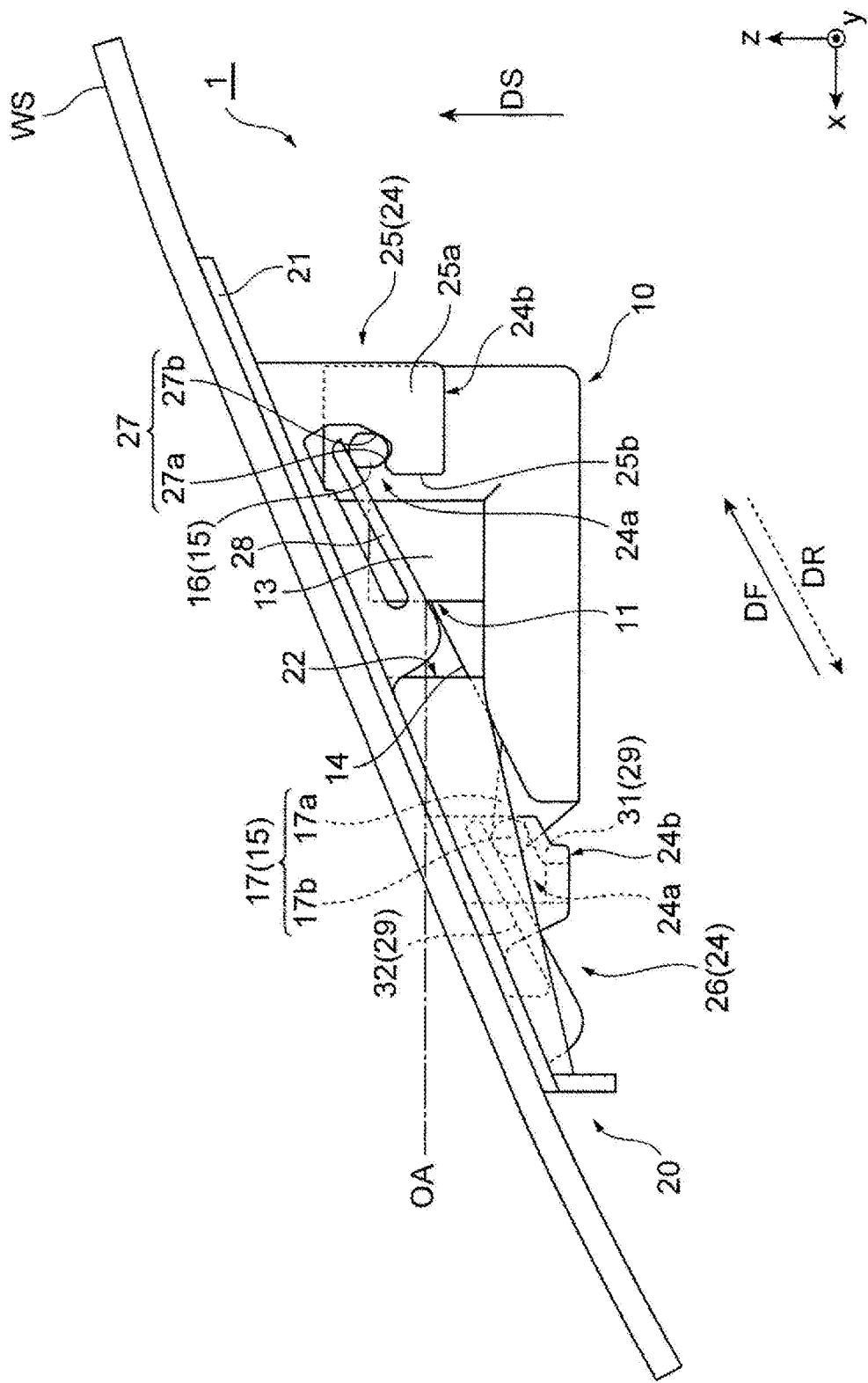
FIG. 1 is a side view of an imaging device according to a first embodiment of the present invention.

FIG. 1 is a side view of an imaging device 1 according to a first embodiment of the present invention. The imaging device 1 of the present embodiment is an in-vehicle imaging device 1 mounted on a vehicle such as an automobile. For example, the imaging device 1 is mounted on an upper portion of a windshield WS of the vehicle, and is used to capture an image of the forward direction of the vehicle through the windshield WS to obtain the distance and velocity of the captured object. Each of the drawings including FIG. 1 illustrates an orthogonal coordinate system having vehicle axes, that is, a roll axis being an x-axis, a pitch axis being a y-axis, and a yaw axis being a z-axis.

The imaging device 1 includes an imaging unit 10 and a bracket 20 that can be used to slidably mounting the imaging unit 10 in a predetermined mounting direction DF. In the bracket 20, for example, a flat plate-like main body 21 is disposed at a predetermined position on the upper portion of the windshield WS along the inner surface of the windshield WS to be inclined with respect to the roll axis (x-axis) and the yaw axis (z-axis) of the vehicle and is fixed to the inner surface of the windshield WS with an adhesive or the like.

The mounting direction DF of the imaging unit 10 with respect to the bracket 20 is a direction generally along the inclination of the main body 21 of the bracket 20 and the windshield WS while being a direction inclined with respect to the roll axis (x-axis) and the yaw axis (z-axis) of the vehicle. Note that in the mounting direction DF of the imaging unit 10, the direction being the negative side in the x-axis direction and being the positive side in the z-axis direction, that is, the direction being the rear side of the vehicle and being the upward side in the vertical direction is defined as a forward direction, while the direction being the positive side in the x-axis direction and being the negative side in the z-axis direction, that is, the direction being the forward side of the vehicle and being the downward side in the vertical direction is defined as a rearward direction.

A support direction DS of the imaging unit 10 by the bracket 20 is a direction that intersects the mounting direction DF of the imaging unit 10 and is a direction substantially parallel to the yaw axis (z-axis) of the vehicle. The support direction DS of the imaging unit 10 is also a direction along the vertical direction in a vehicle traveling on a flat road surface having no inclination, for example. For example, in the mounting direction DF of the imaging unit 10, the inclination angle with respect to the roll axis (x-axis) of the vehicle is smaller than the inclination angle with respect to the yaw axis (z-axis) of the vehicle.

From the viewpoint of facilitating mounting and removal of the imaging unit 10 with respect to the bracket 20, the inclination angle in the mounting direction DF with respect to an optical axis OA of the imaging unit 10, which is substantially parallel to the roll axis (x-axis), is preferably greater than the inclination angle of the main body 21 of the bracket 20 with respect to the optical axis OA. In the case of mounting the bracket 20 to a ceiling portion of the vehicle, the mounting direction DF of the imaging unit 10 with respect to the bracket 20 may be set to a direction along the ceiling portion of the vehicle, for example.

Figure 2:
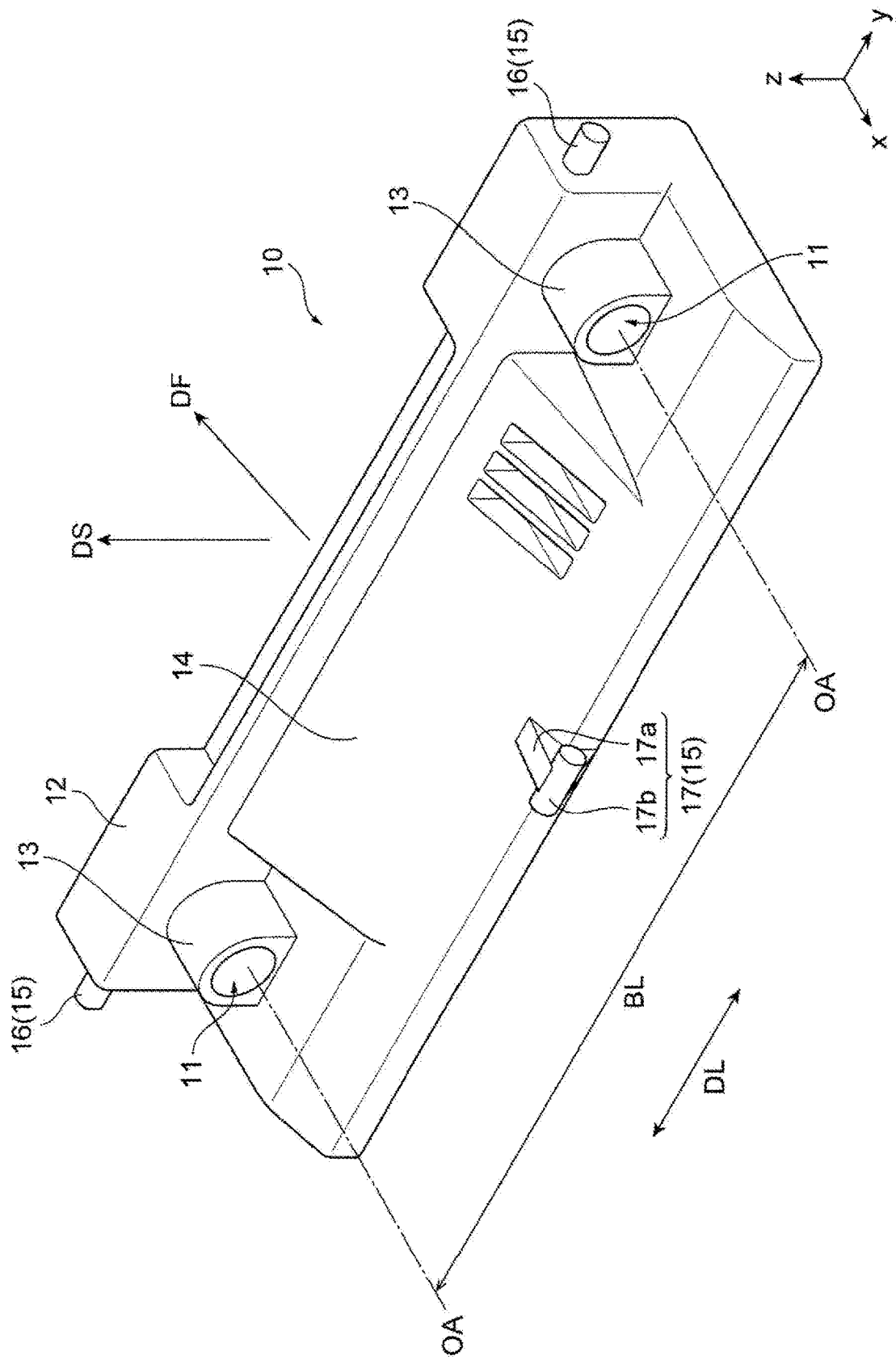
FIG. 2 is a top perspective view of an imaging unit of the imaging device illustrated in FIG. 1.
Figure 3:
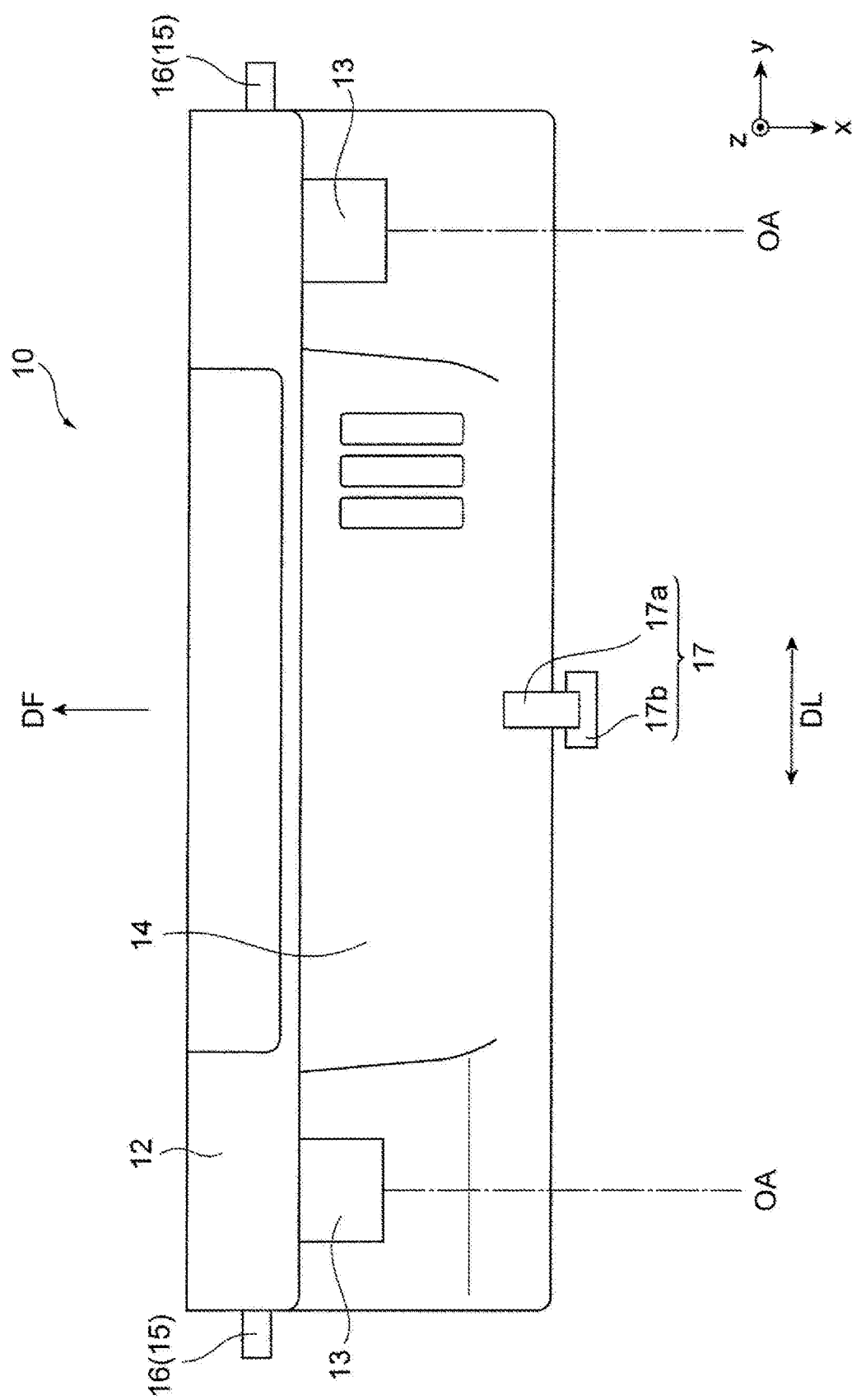
FIG. 3 is a top view of the imaging unit illustrated in FIG. 2.
Figure 4:
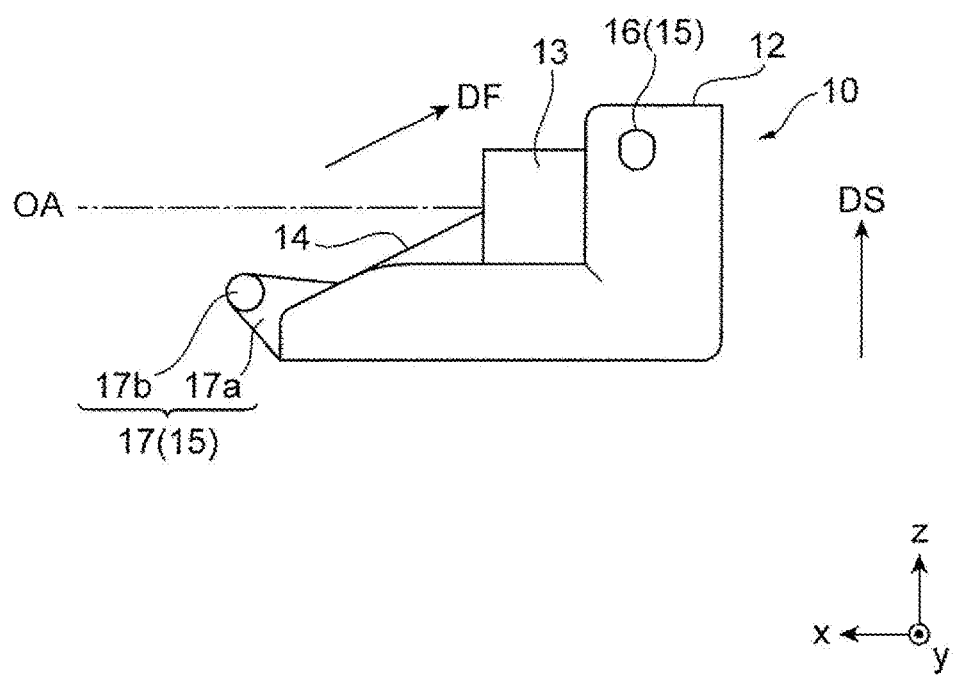
FIG. 4 is a side view of the imaging unit illustrated in FIG. 2.

FIG. 2 is a top perspective view of the imaging unit 10 illustrated in FIG. 1. FIG. 3 is a top view of the imaging unit 10 illustrated in FIG. 2. FIG. 4 is a side view of the imaging unit 10 illustrated in FIG. 2. In the illustrated example, the imaging unit 10 is a stereo camera including a pair of cameras 11. Note that the imaging unit 10 is not limited to a stereo camera, and may be a monocular camera.

The imaging unit 10 includes the pair of cameras 11 and a housing 12 that holds the pair of cameras 11. For example, the imaging unit 10 is positioned with high accuracy so that the mutually parallel optical axes OA of the pair of cameras 11 are set along the roll axis (x-axis) which is the longitudinal direction of the vehicle, and then fixed to the windshield WS via the bracket 20. That is, the direction of the optical axis OA of the imaging unit 10 is a direction intersecting the mounting direction DF of the imaging unit 10 and the support direction DS. Although not illustrated, each of the cameras 11 includes, for example, a lens, a lens barrel, an imaging element, an imaging substrate, or the like, and is fixedly supported by the housing 12.

The housing 12 accommodates and holds the pair of cameras 11 accurately positioned so that the optical axes OA are mutually parallel, while accommodating a circuit board or the like including a signal processing circuit connected to an imaging circuit on the imaging substrate of each of the cameras 11.

For example, the housing 12 is formed of a metal such as stainless steel to have a shape extending in one direction having the maximum dimension in a direction perpendicularly intersecting the optical axis OA of the pair of cameras 11, that is, a direction parallel to a baseline length BL being a distance between the optical axes OA of the pair of cameras 11. The housing 12 defines the outer shape of the imaging unit 10, and a longitudinal direction DL of the housing 12 is the longitudinal direction DL of the imaging unit 10. The housing 12 holds the pair of cameras 11 in a camera holder 13 provided at both end portions in the longitudinal direction DL. With this configuration, it is possible to ensure the baseline length BL of the pair of cameras 11 of the imaging unit 10.

As illustrated in FIG. 1, in the housing 12, the height of the forward side portion of the vehicle, that is, the dimension of the portion on the positive side of the x-axis in the z-axis direction is smaller than the height of the rearward side portion of the vehicle, that is, the dimension of the portion on the negative side of the x-axis in the z-axis direction in accordance with the inclination of the windshield WS. That is, in the imaging unit 10, the height of the rear end portion in the mounting direction DF is lower than the height of the front end portion in the mounting direction DF. In addition, the housing 12 includes, between the pair of camera holder 13, an inclined surface 14 along the mounting direction DF of the imaging unit 10.

The imaging unit 10 has a plurality of supported parts 15 provided at different positions of the housing 12 and supported by the bracket 20. In the illustrated example, the plurality of supported parts 15 of the imaging unit 10 includes three supported parts 15, namely, a pair of first supported parts 16 and one second supported part 17. The first supported part 16 is provided at a position being front end portions in the mounting direction DF of the imaging unit 10 and being both end portions in the longitudinal direction DL (y-axis direction) of the imaging unit 10. The second supported part 17 is provided at a position being the rear end portion in the mounting direction DF of the imaging unit 10 and being the center portion in the longitudinal direction DL of the imaging unit 10.

The number of supported parts 15 is not limited to three, and may be four or more. Furthermore, the plurality of supported parts 15 is only required to include at least one first supported part 16, and can include at least one second supported part 17. For example, the plurality of supported parts 15 may include a plurality of the first supported parts 16 alone, or may include one first supported part 16 and one or more second supported parts 17, or may include two or more first supported parts 16 and two or more second supported parts 17.

The supported part 15 has, at least partially, a pillar shape extending in the axial direction along a direction perpendicular to the mounting direction DF and the support direction DS. In the illustrated example, the axial direction of the pillar-shaped portion of each of the supported parts 15 is substantially parallel to the longitudinal direction DL of the imaging unit 10, that is, the pitch axis (y-axis) of the vehicle.

The first supported part 16 provided at a position being the front end portion of the imaging unit 10 in the mounting direction DF and being both end portions of the imaging unit 10 in the longitudinal direction DL protrudes from the both side surfaces of the housing 12 toward outside of the housing 12 in the longitudinal direction DL of the imaging unit 10. From the viewpoint of supporting and fixing the imaging unit 10 stably and reliably by the bracket 20 and facilitating mounting and removal of the imaging unit 10, the cross-sectional shape of the pillar-shaped first supported part 16 is preferably a circle, an ellipse, oval, or the like, so as to form a shape having a cylindrical curved surface. In other words, it is preferable that the first supported part 16 has a cylindrical shape, an elliptic cylindrical shape, or an oblong cylindrical shape, for example.

The second supported part 17 provided at a position being the rear end portion of the imaging unit 10 in the mounting direction DF and being the center portion of the imaging unit 10 in the longitudinal direction DL includes a first portion 17a and a second portion 17b, for example.

The first portion 17a protrudes rearward in the mounting direction DF of the imaging unit 10 from the center portion of the imaging unit 10 in the longitudinal direction DL. The second portion 17b is provided at the rear end of the first portion 17a in the mounting direction DF of the imaging unit 10. Similarly to the first supported part 16, the second portion 17b has a pillar shape extending in the axial direction along a direction perpendicular to the mounting direction DF and the support direction DS of the imaging unit 10. The shape of the second portion 17b of the second supported part 17 is preferably a cylindrical shape, an elliptic cylindrical shape, or an oblong cylindrical shape, for example.

As illustrated in FIG. 3, the first portion 17a of the second supported part 17 is connected to the center portion in the axial direction of the pillar-shaped second portion 17b and extends in the direction perpendicular to the axial direction of the second portion 17b. This configuration allows the second supported part 17 to protrude toward both sides in the longitudinal direction DL of the imaging unit 10 from the first portion 17a protruding rearward in the mounting direction DF of the imaging unit 10. That is, as illustrated in FIG. 3, the second supported part 17 is formed in a T-shape in a top view.

Figure 5:
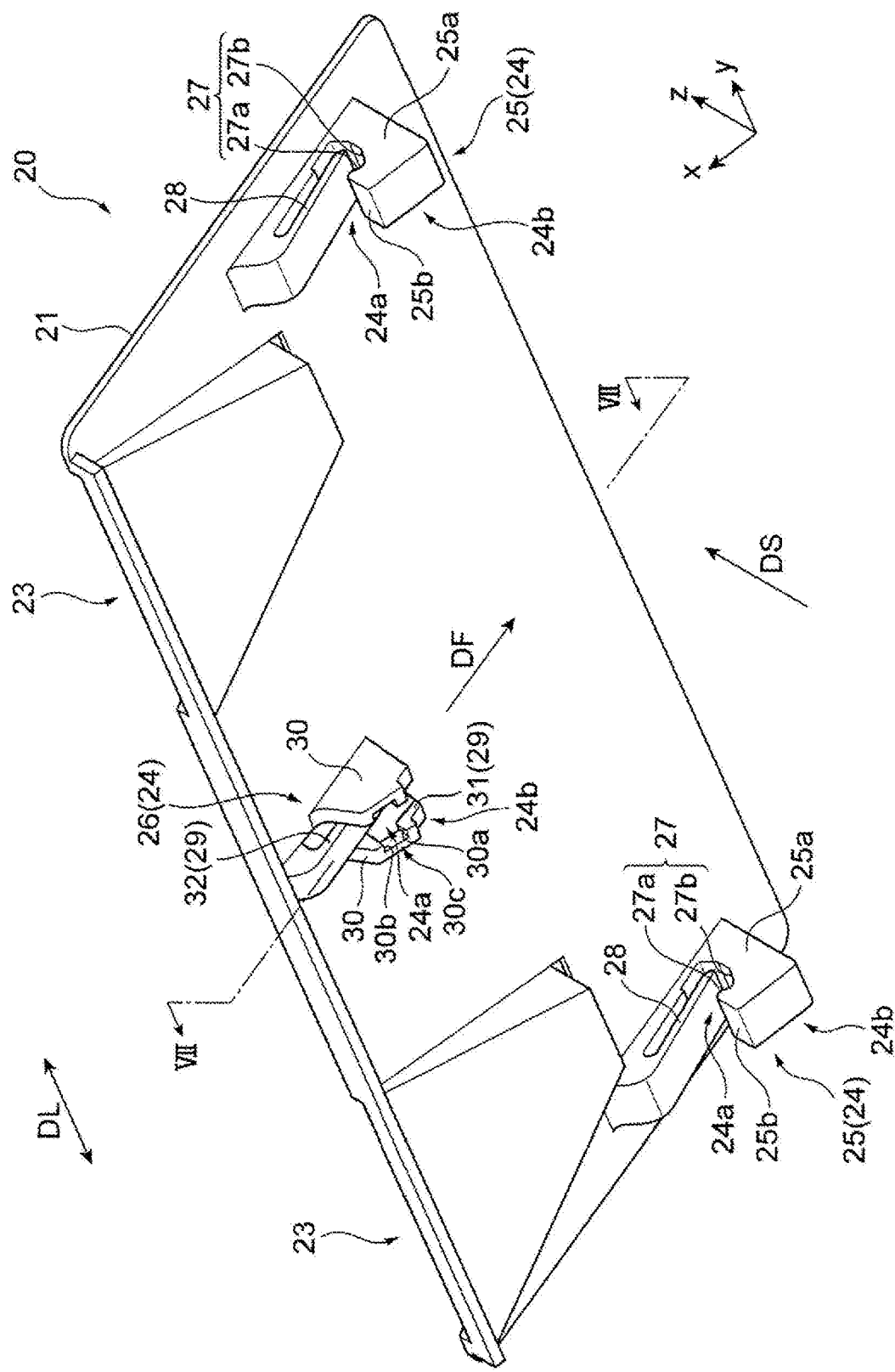
FIG. 5 is a bottom perspective view of a bracket of the imaging device illustrated in FIG. 1.
Figure 6:
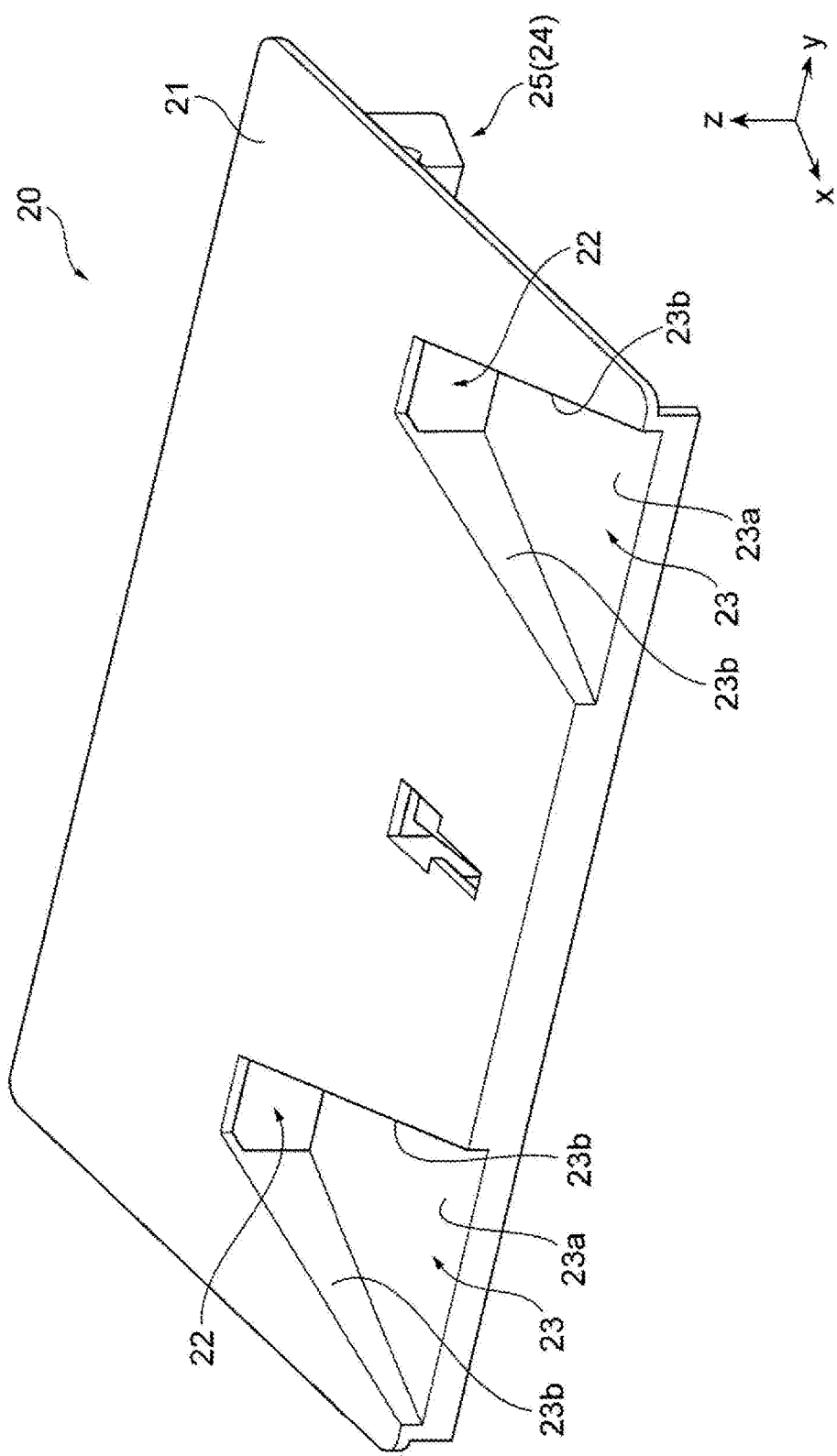
FIG. 6 is a top perspective view of the bracket of the imaging device illustrated in FIG. 1.

FIG. 5 is a bottom perspective view of the bracket 20 of the imaging device 1 illustrated in FIG. 1. FIG. 6 is a top perspective view of the bracket 20 illustrated in FIG. 5.

The bracket 20 is an integrally molded product shaped by integrally molding a resin material, for example. The bracket 20 includes, for example: a main body 21 on a flat plate; a pair of openings 22 opened in the main body 21 so as to expose the pair of cameras 11 of the imaging unit 10; a pair of light shielding portions 23 recessed in the upper surface of the main body 21; and a plurality of support structures 24 projecting from the lower surface of the main body 21 and configured to support the plurality of supported parts 15 of the imaging unit 10.

As illustrated in FIG. 1, the main body 21 is joined and fixed to the upper part on the inner side of the windshield WS of the vehicle, for example, via an adhesive. A slight gap is formed between the windshield WS and the forward side end portion of the main body 21 of the vehicle, that is, the rear end portion in the mounting direction DF of the imaging unit 10. This gap allows air to flow through this gap, making it possible to prevent dew condensation on the imaging device 1.

As illustrated in FIG. 1, the pair of openings 22 is provided to open at positions corresponding to the pair of cameras 11 of the imaging unit 10 mounted to the bracket 20, so as to be surrounded by the light shielding portion 23 as illustrated in FIG. 6. The pair of openings 22 allows the pair of cameras 11 of the imaging unit 10 to be exposed toward the windshield WS, enabling photographing in front of the vehicle via the windshield WS by the imaging unit 10.

As illustrated in FIG. 6, the light shielding portion 23 is a recessed portion provided by recessing the upper surface of the main body 21 downward as viewed from the upper surface side of the main body 21 so as to be formed radially from the opening 22 toward the forward side of the vehicle in the optical axis OA direction of the imaging unit 10. As illustrated in FIG. 5, a portion of the lower surface of the main body 21 corresponding to the light shielding portion 23 protrudes downward. As illustrated in FIG. 6, the bottom surface 23a and the side surface 23b of the light shielding portion 23 surround the lower side and the lateral side of the opening 22 respectively to achieve a radial shape inclined to be away from the optical axis OA as moving from the camera 11 so as to prevent blocking the field of view of the camera 11 of the imaging unit 10. The light shielding portion 23 shields reflected light from the interior of the vehicle, for example, so as to reduce the influence of reflected light on the camera 11.

As illustrated in FIG. 1 and FIG. 5, the plurality of support structures 24 is provided to project from the lower surface of the main body 21 and supports the plurality of supported parts 15 of the imaging unit 10. In the illustrated example, the bracket 20 includes three support structures 24 corresponding to the three supported parts 15 of the imaging unit 10. The number of the support structures 24 of the bracket 20 is not limited to three and may be two, four or more, for example, corresponding to the number of the supported parts 15 of the imaging unit 10.

As will be described in detail below, the plurality of support structures 24 of the bracket 20 can include at least one first support structure 25 from the viewpoint of stably and reliably supporting the imaging unit 10 by using the bracket 20. That is, the plurality of support structures 24 of the bracket 20 may all be the first support structures 25, or may include three or more first support structures 25 corresponding to the supported parts 15 of the imaging unit 10.

Similarly, as will be described in detail below, the plurality of support structures 24 of the bracket 20 may include at least one second support structure 26 from the viewpoint of facilitating the removal of the imaging unit 10 from the bracket 20. That is, the plurality of support structures 24 of the bracket 20 may all be the second support structures 26, or may include two or more second support structures 26 corresponding to the supported parts 15 of the imaging unit 10.

In the illustrated example, the three support structures 24 of the bracket 20 include the pair of first support structures 25 that supports the pair of first supported parts 16 of the imaging unit 10, and the one second support structure 26 that supports the one second supported part 17 of the imaging unit 10. Each of the support structures 24 includes the receiving port 24a and a support 24b. The receiving port 24a opens rearward in the mounting direction DF of the imaging unit 10 and receives the supported part 15 of the imaging unit 10 toward the mounting direction DF. The support 24b supports the supported part 15 of the imaging unit 10 on the forward side of the receiving port 24a in the mounting direction DF of the imaging unit 10 from the support direction DS that intersects the mounting direction DF of the imaging unit 10.

The first support structure 25 includes the receiving port 24a and the support 24b. The support 24b includes an engagement recess 27 and a guide part 28. The engagement recess 27 is provided in a recessed shape in the support direction DS of the imaging unit 10 and engages the supported part 15 of the imaging unit 10. The guide part 28 extends from the rear side to the forward side of the receiving port 24a in the mounting direction DF of the imaging unit 10. In the examples illustrated in FIGS. 1 and 5, the support direction DS of the imaging unit 10 in the first support structure 25 is the up-down direction along the vertical direction. The engagement recess 27 supports the supported part 15 of the imaging unit 10 from below, and the guide part 28 supports the supported part 15 from above.

In the illustrated example, the support 24b of the first support structure 25 includes, on the forward side of the guide part 28 in the mounting direction DF of the imaging unit 10, a claw-like engagement part 25a extending downward from above the guide part 28 in the support direction DS of the imaging unit 10. The engagement part 25a includes: the engagement recess 27 provided at a lower end portion of the imaging unit 10 in the support direction DS; and a guide surface 25b extending from below the receiving port 24a to the receiving port 24a in the support direction DS of the imaging unit 10.

In the illustrated example, the engagement recess 27 provided in the support 24b of the first support structure 25 includes, at the rear end portion in the mounting direction DF of the imaging unit 10, an inclined surface 27a inclined rearward in the mounting direction DF with respect to the support direction DS (z-axis direction) of the imaging unit 10. The engagement recess 27 further includes, at the front end portion in the mounting direction DF of the imaging unit 10, an inclined surface 27b inclined forward in the mounting direction DF of the imaging unit 10 with respect to the support direction DS of the imaging unit 10. These inclined surfaces 27a and 27b allow the engagement recess 27 to have substantially a V-shaped form in a side view illustrated in FIG. 1.

As described above, the guide part 28 provided on the support 24b of the first support structure 25 extends from the rear side to the forward side of the receiving port 24a in the mounting direction DF of the imaging unit 10. The guide part 28 has a rear end portion in the mounting direction DF of the imaging unit 10 defined as a fixed end, a front end portion in the mounting direction DF defined as a free end, and uses its front end portion to bias the supported part 15 toward the engagement recess 27.

That is, the interval between the free end of the guide part 28 and the engagement recess 27 is shorter in a state where the imaging unit 10 is not supported by the bracket 20 illustrated in FIG. 5 as compared with the state where the imaging unit 10 is supported by the bracket 20 illustrated in FIG. 1. In addition, the guide part 28 is provided in the form of a leaf spring which is elastically deformed by receiving a force in the up-down direction being the support direction DS of the imaging unit 10.

Figure 7:
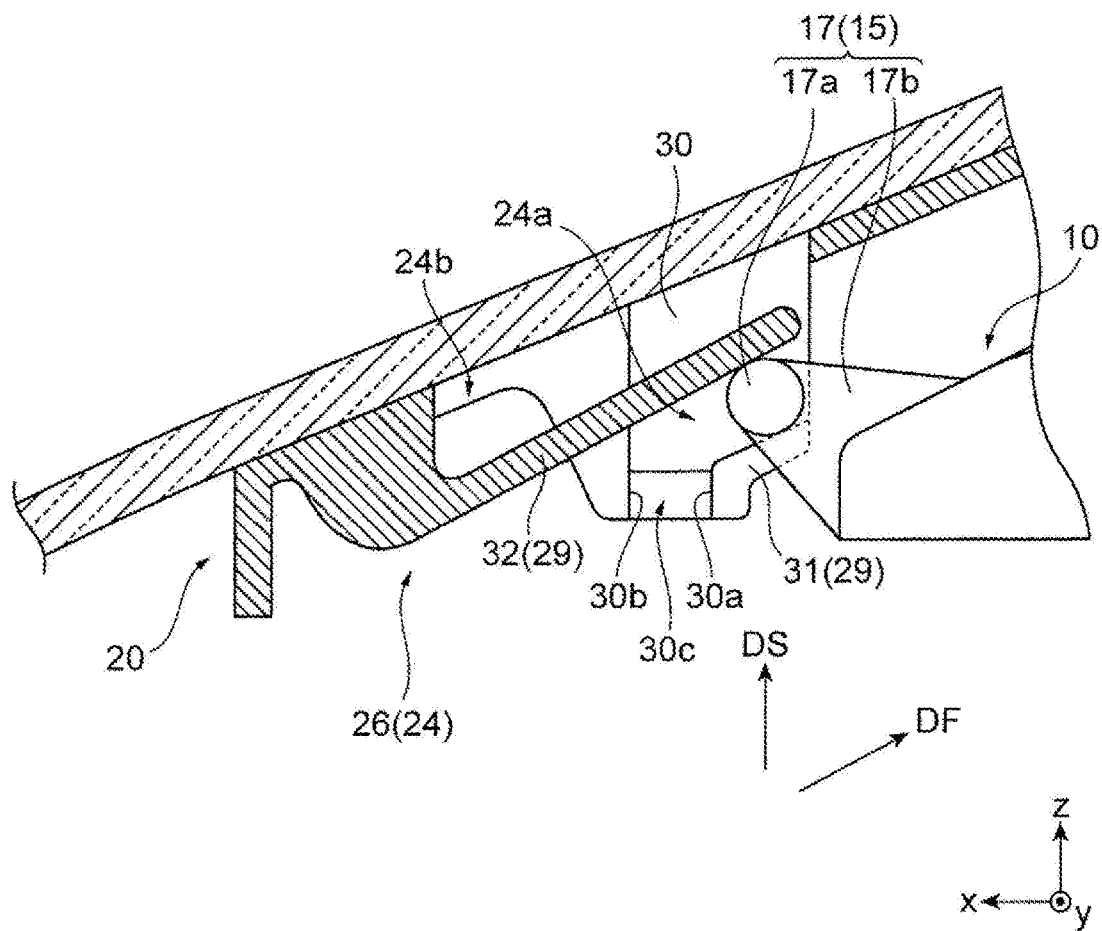
FIG. 7 is an enlarged sectional view taken along line VII-VII of a second support structure of the bracket illustrated in FIG. 5.

FIG. 7 is an enlarged sectional view taken along line VII-VII of the second support structure 26 of the bracket 20 illustrated in FIG. 5. Note that FIG. 7 illustrates the state in which the second supported part 17 of the imaging unit 10 is held by the second support structure 26.

In the imaging device 1 of the present embodiment, the support 24b of the second support structure 26 of the bracket 20 includes a pair of guide parts 29. The pair of guide parts 29 is opposed in the support direction DS of the imaging unit 10, that is, in the up-down direction, and extends from the rearward side to the forward side of the receiving port 24a in the mounting direction DF of the imaging unit 10. In the illustrated example, the pair of guide parts 29 of the second support structure 26 includes: a first guide part 31 that supports the second supported part 17 of the imaging unit 10 from below; and a second guide part 32 that supports the second supported part 17 of the imaging unit 10 from above.

The second guide part 32 out of the pair of guide parts 29 of the second support structure 26 has a configuration similar to the configuration of the guide part 28 of the first support structure 25 illustrated in FIG. 1 described above. In other words, the second guide part 32 has a rear end portion in the mounting direction DF of the imaging unit 10 defined as a fixed end, a front end portion in the mounting direction DF of the imaging unit 10 defined as a free end, and uses its front end portion to bias the supported part 15 toward the first guide part 31.

Note that the imaging device 1 of the present embodiment is configured such that the second support structure 26 of the bracket 20 includes a pair of guide walls 30 being opposed in the longitudinal direction DL (y-axis direction) of the imaging unit 10 and extending in the up-down direction being the support direction DS of the imaging unit 10 as illustrated in FIG. 5. The first guide part 31 out of the pair of guide parts 29 of the second support structure 26 is provided on each of the pair of guide walls 30. The second guide part 32 out of the pair of guide parts 29 of the second support structure 26 is disposed between the pair of guide walls 30.

As illustrated in FIG. 7, the pair of guide walls 30 of the second support structure 26 includes: a first guide surface 30a; a second guide surface 30b; and an inlet 30c, individually on each of opposing surfaces in the longitudinal direction DL of the imaging unit 10. The first guide surface 30a extends in the up-down direction from below the receiving port 24a that receives the second supported part 17 of the imaging unit 10 to the receiving port 24a.

The second guide surface 30b extends in the up-down direction with respect to the first guide surface 30a so as to be opposed in the rear side in the mounting direction DF of the imaging unit 10. The inlet 30c opens downward between the first guide surface 30a and the second guide surface 30b, and upwardly receives the second supported part 17 of the imaging unit 10.

Figure 8:
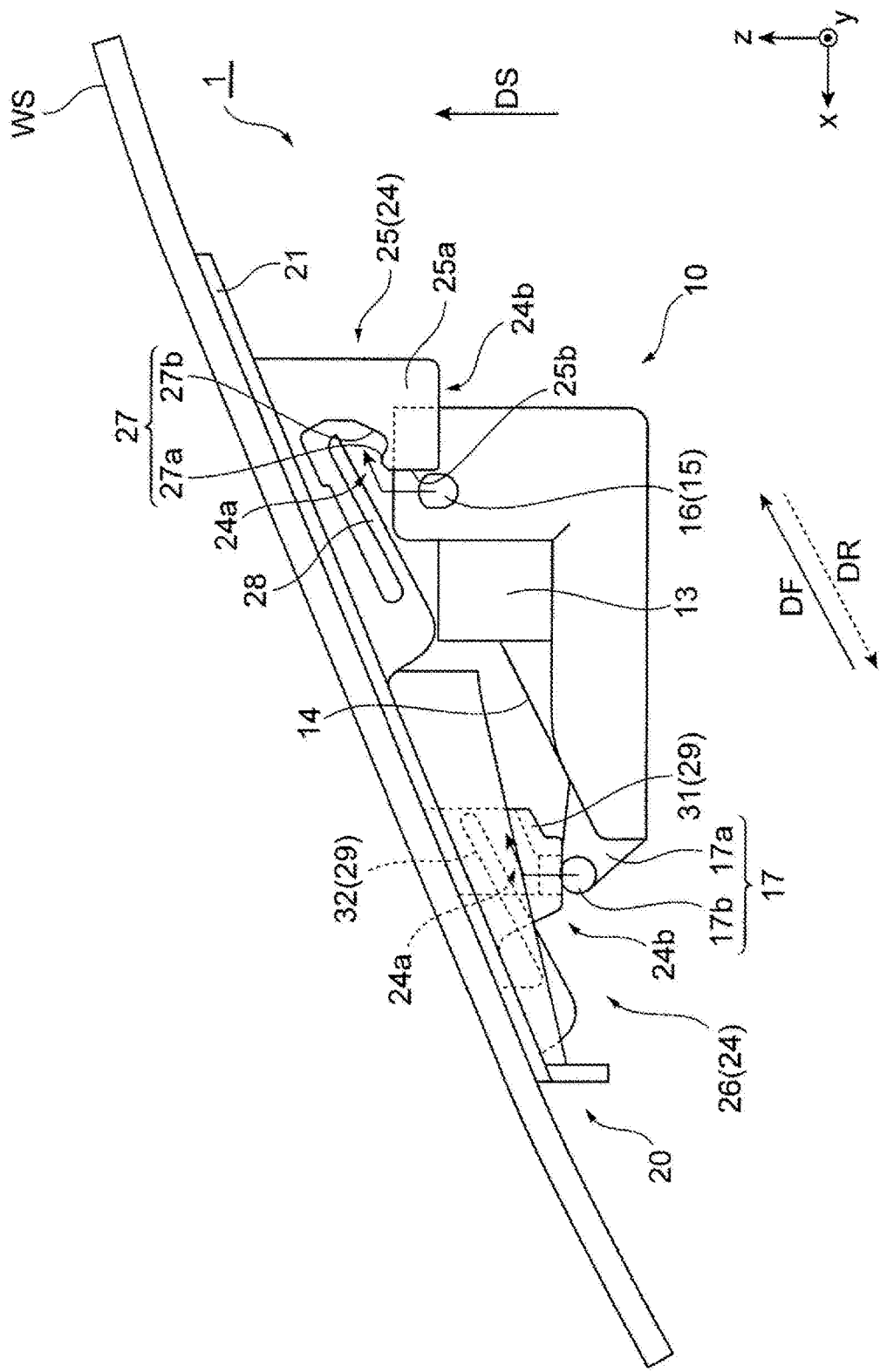
FIG. 8 is a side view illustrating a procedure for mounting the imaging unit to the bracket of the imaging device illustrated in FIG. 1.

Hereinafter, operation of the imaging device 1 of the present embodiment will be described. FIG. 8 is a side view illustrating a procedure of mounting the imaging unit 10 to the bracket 20 in the imaging device 1 of the present embodiment illustrated in FIG. 1.

As described above, the imaging device 1 of the present embodiment includes the imaging unit 10 and the bracket 20 that can be used to mount the imaging unit 10 in the mounting direction DF. The imaging unit 10 includes the plurality of supported parts 15 supported by the bracket 20, and the bracket 20 includes the plurality of support structures 24 that supports the plurality of supported parts 15 of the imaging unit 10. Furthermore, the support structure 24 includes: the receiving port 24a opened toward the rear of a mounting direction DF of the imaging unit 10 for receiving the supported parts 15 of the imaging unit 10 in the mounting direction DF; and the support 24b that supports the supported parts 15 on the forward side of this receiving port 24a in the mounting direction DF of the imaging unit 10 from the support direction DS that intersects the mounting direction DF of the imaging unit 10.

In the imaging device 1 having such a configuration, the imaging unit 10 can be mounted to the bracket 20 fixed to the upper part of the front windshield WS of the vehicle by using the following procedure, for example. First, the plurality of supported parts 15 of the imaging unit 10 is aligned with the plurality of support structures 24 of the bracket 20. Thereafter, sliding the imaging unit 10 in the mounting direction DF causes the plurality of supported parts 15 of the imaging unit 10 to be received by the receiving port 24a provided in each of the plurality of support structures 24 of the bracket 20 and that opens toward the rear in the mounting direction DF.

In this manner, after the plurality of supported parts 15 of the imaging unit 10 has been received in the receiving ports 24a of the plurality of support structures 24 of the bracket 20, sliding the imaging unit 10 further in the mounting direction DF causes the plurality of supported parts 15 of the imaging unit 10 to move forward in the mounting direction DF with respect to the receiving ports 24a of the plurality of support structures 24. Subsequently, the plurality of supported parts 15 of the imaging unit 10 is to be supported by the support portions 24b individually provided on the plurality of support structures 24 of the bracket 20 from the support direction DS intersecting the mounting direction DF. With the above-described procedure, the imaging unit 10 is mounted to the bracket 20.

Furthermore, at the time of removing the imaging unit 10 from the bracket 20 in the imaging device 1 of the present embodiment, sliding the imaging unit 10 rearward in the mounting direction DF, that is, in a removing direction DR opposite to the mounting direction DF causes the plurality of supported parts 15 of the imaging unit 10 to move from the support 24b of the plurality of support structures 24 of the bracket 20 to the receiving port 24a. Sliding the imaging unit 10 further in the removing direction DR causes the plurality of supported parts 15 of the imaging unit 10 to move in the removing direction DR from the receiving ports 24a of the plurality of support structures 24 of the bracket 20, leading to release of a support of the plurality of supported parts 15 of the imaging unit 10 provided by the plurality of support structures 24 of the bracket 20. With the above-described procedure, the imaging unit 10 is removed from the bracket 20.

Therefore, according to the imaging device 1 of the present embodiment, it is only necessary to slide the imaging unit 10 in a predetermined mounting direction DF or its opposite direction, namely, the removing direction DR at the time of mounting and removing the imaging unit 10 to and from the bracket 20, making it possible to easily perform the mounting/removal of the imaging unit 10 with simpler operation than the conventional technique. In addition, there is no need to turn the imaging unit 10, making it possible to reduce the work space as compared with the conventional technique.

In addition, as described above, the plurality of support structures 24 of the bracket 20 of the imaging device 1 of the present embodiment may include at least one first support structure 25. In the example illustrated, the bracket 20 includes two first support structures 25. The first support structure 25 includes the guide part 28 extending from the rear side to the forward side of the receiving port 24a in the mounting direction DF of the imaging unit 10.

Therefore, when the plurality of supported parts 15 of the imaging unit 10 is received by the receiving ports 24a of the plurality of support structures 24 of the bracket 20, it is possible to abut the first supported part 16 of the imaging unit 10 against the guide part 28 rearward in the mounting direction DF of the imaging unit 10 with respect to the receiving port 24a of the first support structure 25. Thereafter, it is possible to use the guide part 28 to guide the first supported part 16 of the imaging unit 10 and slide it in the mounting direction DF of the imaging unit 10. This makes it possible to facilitate reception of the first supported part 16 of the imaging unit 10 by the receiving port 24a of the first support structure 25.

Conversely, when moving the plurality of supported parts 15 of the imaging unit 10 in the removing direction DR from the receiving ports 24a of the plurality of support structures 24 of the bracket 20, it is possible to abut the plurality of supported parts 15 of the imaging unit 10 against the guide part 28 of the first support structure 25. Thereafter, it is possible to use the guide part 28 of the first support structure 25 to guide the first supported part 16 of the imaging unit 10 to slide it in the removing direction DR of the imaging unit 10. This makes it possible to facilitate removal of the first supported part 16 of the imaging unit 10 from the first support structure 25.

In addition, as described above, the plurality of support structures 24 of the bracket 20 of the imaging device 1 of the present embodiment may include at least one second support structure 26. In the illustrated example, the bracket 20 includes one second support structure 26. The support 24b of the second support structure 26 includes the pair of guide parts 29 opposed in the support direction DS of the imaging unit 10 and extending from the rear side to the forward side of the receiving port 24a in the mounting direction DF of the imaging unit 10.

Therefore, when the plurality of supported parts 15 of the imaging unit 10 is received in the receiving ports 24a of the plurality of support structures 24 of the bracket 20, it is possible to arrange the second supported part 17 of the imaging unit 10 between the pair of guide parts 29 on the rearward side in the mounting direction DF of the imaging unit 10 with respect to the receiving port 24a of the second support structure 26. Thereafter, it is possible to use the pair of guide parts 29 to guide the second supported part 17 of the imaging unit 10 and slide it in the mounting direction DF of the imaging unit 10. This makes it possible to facilitate reception of the second supported part 17 of the imaging unit 10 by the receiving port 24a of the second support structure 26.

Conversely, when moving the plurality of supported parts 15 of the imaging unit 10 in the removing direction DR from the receiving ports 24a of the plurality of support structures 24 of the bracket 20, it is also possible to arrange the second supported part 17 of the imaging unit 10 between the pair of guide parts 29 of the second support structure 26. Thereafter, it is possible to use the pair of guide part 29 of the second support structure 26 to guide the second supported part 17 of the imaging unit 10 and slide it in the removing direction DR of the imaging unit 10. This facilitates the removal of the second supported part 17 of the imaging unit 10 from the second support structure 26.

In the imaging device 1 of the present embodiment, the support 24b of the first support structure 25 of the bracket 20 includes the engagement recess 27 for engaging the first supported part 16 of the imaging unit 10. The engagement recess 27 is provided in a downward recessed shape in the up-down direction being the support direction DS of the imaging unit 10 intersecting the mounting direction DF of the imaging unit 10.

Therefore, the first supported part 16 of the imaging unit 10 engages the engagement recess 27 provided on the support 24b of the first support structure 25 of the bracket 20 downward in the support direction DS that intersects the mounting direction DF of the imaging unit 10, leading to restriction of the front-rear movement of the imaging unit 10 in the mounting direction DF. Moreover, the first supported part 16 of the imaging unit 10 is supported from both sides in the support direction DS between the engagement recess 27 and the guide part 28, which are opposed to each other in the support direction DS in the first support structure 25. With this configuration, even when vibration or shock acts on the imaging unit 10, the first support structure 25 of the bracket 20 can further stably and reliably support the first supported part 16 of the imaging unit 10

In addition, in the imaging device 1 of the present embodiment, the support 24b of the second support structure 26 of the bracket 20 includes the pair of guide parts 29 opposed in the support direction DS of the imaging device 1 and extending from the rearward side to the forward side of the receiving port 24a in the mounting direction DF of the imaging unit 10, as described above. Therefore, the second supported part 17 of the imaging unit 10 received in the mounting direction DF of the imaging unit 10 from the receiving port 24a of the second support structure 26 can be supported by the pair of guide parts 29 from both sides in the support direction DS of the imaging unit 10. With this configuration, even when vibration or shock acts on the imaging unit 10, the second support structure 26 of the bracket 20 can further stably and reliably support the second supported part 17 of the imaging unit 10

Furthermore, in the imaging device 1 of the present embodiment, the imaging unit 10 has its maximum dimension in the longitudinal direction DL intersecting the mounting direction DF and the support direction DS. Furthermore, in the imaging unit 10, the plurality of supported parts 15 includes: the pair of first supported parts 16 provided at a position being at the front end portion in the mounting direction DF and being at both end portions in the longitudinal direction DL; and at least one second supported parts 17 provided at a position being at the rear end portion in the mounting direction DF and being at the center portion in the longitudinal direction DL. In the illustrated example, the imaging unit 10 has one second supported part 17. The plurality of support structures 24 of the bracket 20 can include: the pair of first support structures 25 that supports the pair of first supported parts 16 of the imaging unit 10; and at least one second support structure 26 that supports at least one second supported part 17 of the imaging unit 10. In the example illustrated, the plurality of support structures 24 of the bracket 20 includes one second support structure 26.

With this configuration, as illustrated in the illustrated example, it is possible to support the imaging unit 10 at three points in total, that is, at one point being at the rear end portion of the mounting direction DF of the imaging unit 10 and being at the center portion in the longitudinal direction DL and two points being at the front end portion in the mounting direction DF of the imaging unit 10 and being at both end portions of the longitudinal direction DL of the imaging unit 10. Although not illustrated in the drawing, it is also possible to support the imaging unit 10 at four points or more in total, that is, at two points or more being at the rear end portion in the mounting direction DF of the imaging unit 10 and being at the center portion in the longitudinal direction DL, and two points being at the front end in the mounting direction DF of the imaging unit 10 and being at both end portions in the longitudinal direction DL of the imaging unit 10. Therefore, in a case where the imaging unit 10 is a stereo camera having the direction of the baseline length BL defined as the longitudinal direction DL, it is possible to achieve accurate positioning and stable support of the imaging unit 10, leading to improvement of measurement accuracy of the distance or the like to the photographing target.

Furthermore, in the imaging device 1 of the present embodiment, the support direction DS of the imaging unit 10 by the bracket 20 is the up-down direction along the vertical direction. In the first support structure 25 of the bracket 20, the engagement recess 27 supports the first supported part 16 of the imaging unit 10 from below, and the guide part 28 supports the first supported part 16 of the imaging unit 10 from above. With this configuration, the first support structure 25 of the bracket 20 can further stably and reliably support the first supported part 16 of the imaging unit 10 from both sides in the up-down direction.

Meanwhile, in the imaging device 1 of the present embodiment in which the support direction DS of the imaging unit 10 by the bracket 20 is the up-down direction, the pair of guide parts 29 of the second support structure 26 of the bracket 20 includes the first guide part 31 and the second guide part 32. The first guide part 31 supports the supported part 15 of the imaging unit 10 from below, while the second guide part 32 supports the supported part 15 of the imaging unit 10 from above. With this configuration, the second support structure 26 of the bracket 20 can further stably and reliably support the second supported part 17 of the imaging unit 10 from both sides in the up-down direction as well.

In the imaging device 1 of the present embodiment, the engagement recess 27 provided in the support 24b of the first support structure 25 of the bracket 20 includes, at the rear end portion in the mounting direction DF of the imaging unit 10, the inclined surface 27a inclined rearward in the mounting direction DF of the imaging unit 10 with respect to the support direction DS of the imaging unit 10. With this configuration, at the time of mounting the imaging unit 10 to the bracket 20, the first supported part 16 of the imaging unit 10 received from the receiving port 24a of the first support structure 25 of the bracket 20 can be guided by the inclined surface 27a from the receiving port 24a toward the bottom of the engagement recess 27, so as to be easily engaged with the engagement recess 27.

Conversely, at the removal of the imaging unit 10 from the bracket 20, sliding the imaging unit 10 in the removing direction DR opposite to the mounting direction DF allows the first supported part 16 of the imaging unit 10 to be pressed against the inclined surface 27a provided at the rear end portion of the engagement recess 27 in the mounting direction DF of the imaging unit 10. Since the inclined surface 27a is inclined rearward in the mounting direction DF of the imaging unit 10, pressing the first supported part 16 of the imaging unit 10 in the removing direction DR toward the rear side of the mounting direction DF the imaging unit 10 would slide the first supported part 16 along the inclined surface 27a and guide it to the receiving port 24a of the first support structure 25. With this configuration, by simply sliding the imaging unit 10 in the removing direction DR, it is possible to easily remove the first supported part 16 of the imaging unit 10 engaged with the engagement recess 27 of the first support structure 25 of the bracket 20 from the engagement recess 27.

In the imaging device 1 of the present embodiment, the engagement recess 27 provided in the support 24b of the first support structure 25 of the bracket 20 includes, at the front end portion in the mounting direction DF of the imaging unit 10, the inclined surface 27b inclined forward in the mounting direction DF of the imaging unit 10 with respect to the support direction DS of the imaging unit 10. With this configuration, it is possible to allow the first supported part 16 of the imaging unit 10 that has been guided by the inclined surface 27a on the rear end side of the engagement recess 27 in the mounting direction DF of the imaging unit 10 from the receiving port 24a of the first support structure 25 to the bottom of the engagement recess 27 to be supported by being abutting against the inclined surface 27b on the forward side in the mounting direction DF of the imaging unit 10 That is, the first supported part 16 of the imaging unit 10 can be held between the pair of V-shaped inclined surfaces 27a and 27b opposing in the mounting direction DF of the imaging unit 10 in the engagement recess 27. Accordingly, the first support structure 25 of the bracket 20 can stably and reliably support the first supported part 16 of the imaging unit 10.

Moreover, in the imaging device 1 of the present embodiment, the guide part 28 provided on the support 24b of the first support structure 25 of the bracket 20 has the rear end portion in the mounting direction DF of the imaging unit 10 defined as a fixed end, while having the front end portion in the mounting direction DF of the imaging unit 10 defined as a free end. The front end portion defined as the free end of the guide part 28 biases the first supported part 16 of the imaging unit 10 toward the engagement recess 27 of the first support structure 25. This makes it possible to reliably engage the first supported part 16 of the imaging unit 10 with the engagement recess 27 of the first support structure 25 and possible to stably and reliably support the first supported part 16 of the imaging unit 10 by using the first support structure 25 of the bracket 20.

Furthermore, at the removal of the imaging unit 10 from the bracket 20, sliding the imaging unit 10 in the removing direction DR opposite to the mounting direction DF as described above allows the first supported part 16 of the imaging unit 10 to move upward from the bottom of the engagement recess 27 by the inclined surface 27a provided at the rear end portion of the engagement recess 27 in the mounting direction DF. At this time, the first support structure 25 that biases the first supported part 16 of the imaging unit 10 toward the engagement recess 27 of the first support structure 25 is elastically deformed upward, allowing the first supported part 16 of the imaging unit 10 to reach the receiving port 24a so as to be removed from the first support structure 25. Accordingly, by simply sliding the imaging unit 10 in the removing direction DR, it is possible to easily remove the imaging unit 10 from the bracket 20.

Moreover, in the imaging device 1 of the present embodiment, the second guide part 32 provided on the support 24b of the second support structure 26 of the bracket 20 has the rear end portion in the mounting direction DF of the imaging unit 10 defined as a fixed end while having the front end portion in the mounting direction DF of the imaging unit 10 defined as a free end similarly to the guide part 28 of the first support structure 25. The front end portion defined as the free end of the second guide part 32 biases the second supported part 17 of the imaging unit 10 toward the first guide part 31. This makes it possible to sandwich the second supported part 17 of the imaging unit 10 between the pair of guide parts 29 of the second support structure 26, and possible to stably and reliably support the second supported part 17 of the imaging unit 10 by using the second support structure 26 of the bracket 20.

Furthermore, at the removal of the imaging unit 10 from the bracket 20, it is possible, as described above, to slide the imaging unit 10 in the removing direction DR opposite to the mounting direction DF and to slide the second supported part 17 of the imaging unit 10 in the removing direction DR between the first guide part 31 and the second guide part 32 of the second support structure 26 of the bracket 20. Thus, by simply sliding the imaging unit 10 in the removing direction DR, the second supported part 17 of the imaging unit 10 can easily reach the receiving port 24a of the second support structure 26, and the second supported part 17 of the imaging unit 10 2 can be easily removed from the second support structure 26.

In addition, in the imaging device 1 of the present embodiment, the support 24b of the first support structure 25 of the bracket 20 includes, on the forward side of the guide part 28 in the mounting direction DF of the imaging unit 10, the engagement part 25a extending downward from above the guide part 28 in the support direction DS of the imaging unit 10. Moreover, the engagement part 25a includes: the engagement recess 27 provided at a lower end portion of the imaging unit 10 in the support direction DS; and a guide surface 25b extending from below the receiving port 24a to the receiving port 24a in the support direction DS of the imaging unit 10.

Accordingly, at the time of mounting the imaging unit 10 to the bracket 20, the first supported part 16 of the imaging unit 10 can be abutted against the guide surface 25b of the support 24b of the first support structure 25 of the bracket 20 to be pressed forward in the mounting direction DF, enabling sliding the front end portion in the mounting direction DF of the imaging unit 10 upward in the support direction DS. This makes it possible to allow the first supported part 16 of the imaging unit 10 to be guided to the receiving port 24a by using the guide surface 25b of the first support structure 25 to be easily received by the receiving port 24a and engaged with the engagement recess 27. Therefore, at the time of mounting the imaging unit 10 to the bracket 20, it is possible to easily support the first supported part 16 of the imaging unit 10 by using the first support structure 25 of the bracket 20.

Furthermore, in the imaging device 1 of the present embodiment, the imaging unit 10 has its maximum dimension in the longitudinal direction DL intersecting the mounting direction DF and the support direction DS as described above. The second support structure 26 of the bracket 20 includes the pair of guide walls 30 extending in the up-down direction being opposed in the longitudinal direction DL of the imaging unit 10. The first guide part 31 of the second support structure 26 is provided on each of the pair of guide walls 30, while the second guide part 32 is disposed between the pair of guide walls 30. Each of the guide walls 30 includes the first guide surface 30a, the second guide surface 30b, and the inlet 30c.

The first guide surface 30a extends from below the receiving port 24a of the second support structure 26 to the receiving port 24a in the up-down direction. The second guide surface 30b extends in the up-down direction with respect to the first guide surface 30a so as to be opposed in the rear side in the mounting direction DF of the imaging unit 10. The inlet 30c opens downward between the first guide surface 30a and the second guide surface 30b so as to downwardly expose a part of the second guide part 32 of the second support structure 26, and also upwardly receives the supported part 15 of the imaging unit 10.

With such a configuration, at the time of mounting the imaging unit 10 to the bracket 20, the second supported part 17 of the imaging unit 10 can be received from downward to the inlet 30c between the first guide surface 30a and the second guide surface 30b provided on the pair of guide walls 30 of the second support structure 26 of the bracket 20. Further upwardly moving the rear end portion of the imaging unit 10 in the mounting direction DF allows the second supported part 17 of the imaging unit 10 to be guided upward between the first guide surface 30a and the second guide surface 30b to be abutted against the second guide part 32 arranged between the pair of guide walls 30 of the second support structure 26 of the bracket 20 from below. Sliding the imaging unit 10 in the mounting direction DF in this state would allow the second supported part 17 of the imaging unit 10 to be guided by the first guide part 31 and the second guide part 32 of the second support structure 26 of the bracket 20 from both sides in the support direction DS, so as to be easily received by the receiving port 24a.

On the contrary, at removal of the imaging unit 10 from the bracket 20, sliding the imaging unit 10 in the removing direction DR allows the second supported part 17 of the imaging unit 10 to be guided by the first guide part 31 and the second guide part 32 of the second support structure 26 so as to be moved to a position between the first guide surface 30a and the second guide surface 30b provided on the pair of guide walls 30. Then, the second supported part 17 of the imaging unit 10 is guided by the first guide surface 30a and the second guide surface 30b so as to move the rear end portion of the imaging unit 10 in the mounting direction DF downward, enabling the removal of the second support structure 26. Accordingly, it is possible facilitate removal of the second supported part 17 of the imaging unit 10 from the second support structure 26 of the bracket 20.

Moreover, in the imaging device 1 of the present embodiment, the supported part 15 of the imaging unit 10 has a pillar shape extending in the axial direction along a direction perpendicular to the mounting direction DF and the support direction DS. This makes it is possible to stably and reliably support the supported part 15 of the imaging unit 10 from the support direction DS intersecting in the axial direction by the support structure 24 of the bracket 20. Furthermore, in operation of mounting the imaging unit 10 to the bracket 20 or removing it from the bracket 20, the supported part 15 of the imaging unit 10 can be abutted against the guide surface 25b of the first support structure 25 extending in the support direction DS intersecting in the axial direction or abutted against the first guide surface 30a and the second guide surface 30b of the second support structure 26 to be guided in the support direction DS. Furthermore, the supported part 15 of the imaging unit 10 can be abutted against the guide part 28 of the first support structure 25 and the pair of guide parts 29 of the second support structure 26 extending in the mounting direction DF intersecting in the axial direction, so as to be guided in the mounting direction DF. Accordingly, it is possible to facilitate the mounting and removal of the imaging unit 10 to and from the bracket 20.

Moreover, in the imaging device 1 of the present embodiment, the second supported part 17 of the imaging unit 10 includes the first portion 17a protruding rearward in the mounting direction DF from the center portion in the longitudinal direction DL of the imaging unit 10. The second supported part 17 of the imaging unit 10 is provided at the rear end of the mounting direction DF of the first portion 17a and includes the pillar-shaped second portion 17b extending in the axial direction along a direction perpendicular to the mounting direction DF and the support direction DS.

With this configuration, both ends in the axial direction of the second portion 17b of the second supported part 17 provided in the center portion in the longitudinal direction DL at the rear end portion of the mounting direction DF of the imaging unit 10 can be guided by the first guide surface 30a and the second guide surface 30b of the pair of guide walls 30 of the second support structure 26 being opposed in the longitudinal direction DL. Therefore, the second supported part 17 of the imaging unit 10 can be easily mounted to the second support structure 26 of the bracket 20 or easily removed from the second support structure 26.

Furthermore, it is possible to sandwich the both ends in the axial direction of the second portion 17b of the second supported part 17 of the imaging device 1 from both sides in the support direction DS by using the first guide part 31 provided on the pair of guide walls 30 of the second support structure 26 and by the second guide part 32 disposed between the pair of guide walls 30. Accordingly, the second supported part 17 of the imaging unit 10 can be reliably supported by the second support structure 26 of the bracket 20.

In the imaging device 1 of the present embodiment, the mounting direction DF of the imaging unit 10 is a direction along the inclination of the windshield WS of the vehicle that intersects with the support direction DS and the optical axis OA direction of the imaging unit 10. Therefore, in mounting the imaging unit 10 to the bracket 20 or removing it from the bracket 20, it is possible to prevent the imaging unit 10 from interfering with the windshield WS, leading to facilitation of mounting of the imaging unit 10.

In particular, in a case where the inclination angle of the mounting direction DF of the imaging unit 10 with respect to the optical axis OA is greater than the inclination angle of the main body 21 of the bracket 20 with respect to the optical axis OA, the imaging unit 10 is moved in a direction away from the windshield WS at the time of allow the imaging unit 10 to slide in the removing direction DR opposite to the mounting direction DF. Therefore, at the removal of the imaging unit 10 from the bracket 20, interference between the imaging unit 10 and the windshield WS can be further reliably prevented, and the imaging unit 10 can be further easily removed.

As described above, according to the imaging device 1 of the present embodiment, it is only necessary to slide the imaging unit 10 in a predetermined mounting direction DF or its opposite direction, namely, the removing direction DR at the time of mounting and removing the imaging unit 10 to and from the bracket 20, making it possible to easily perform the mounting/removal of the imaging unit 10 with simpler operation than the conventional technique. In addition, there is no need to turn the imaging unit 10, making it possible to reduce the work space as compared with the conventional technique.

Second Embodiment

Hereinafter, a second embodiment of an imaging device of the present invention will be described with reference to FIGS. 9 to 12.

Figure 9:
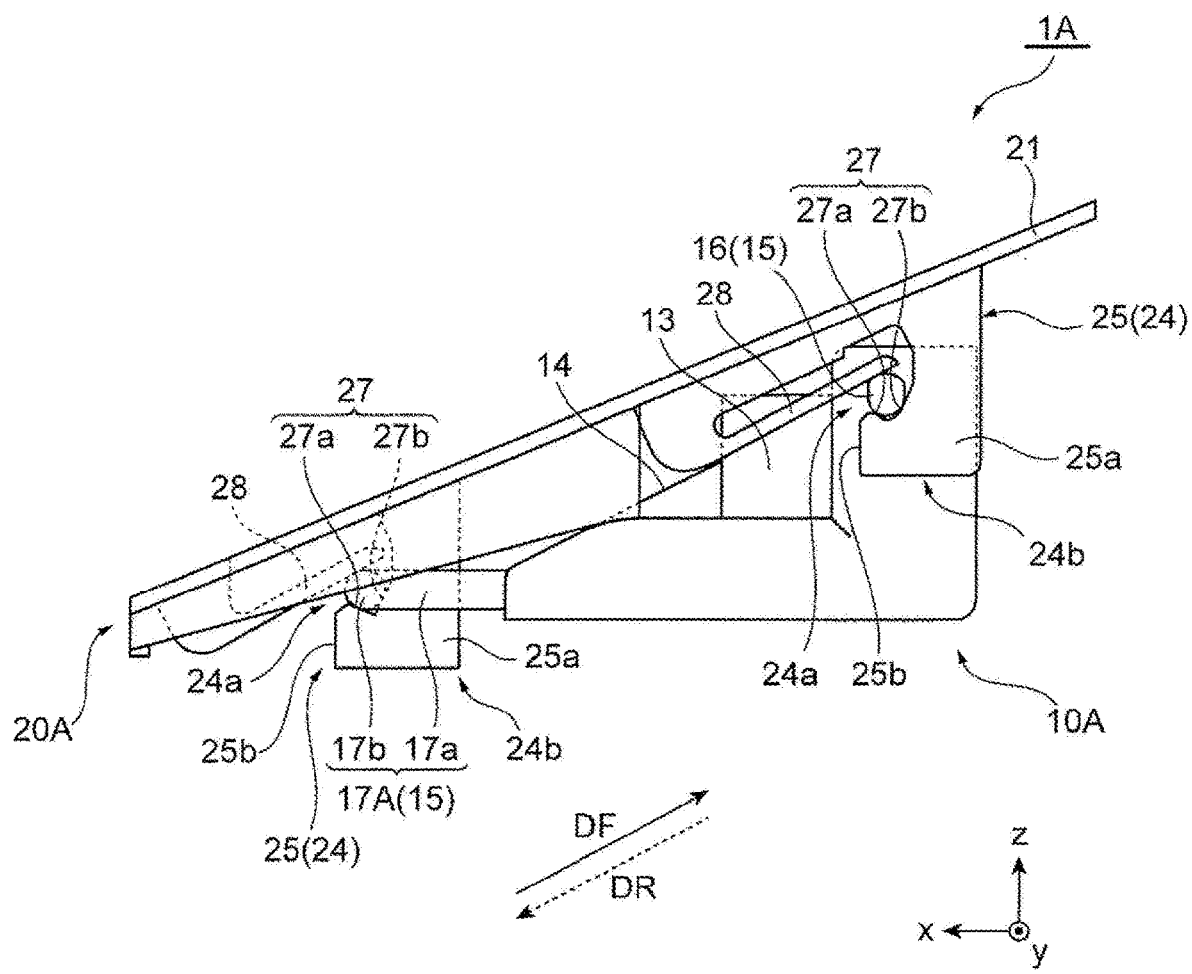
FIG. 9 is a side view of an imaging device according to a second embodiment of the present invention.
Figure 10:
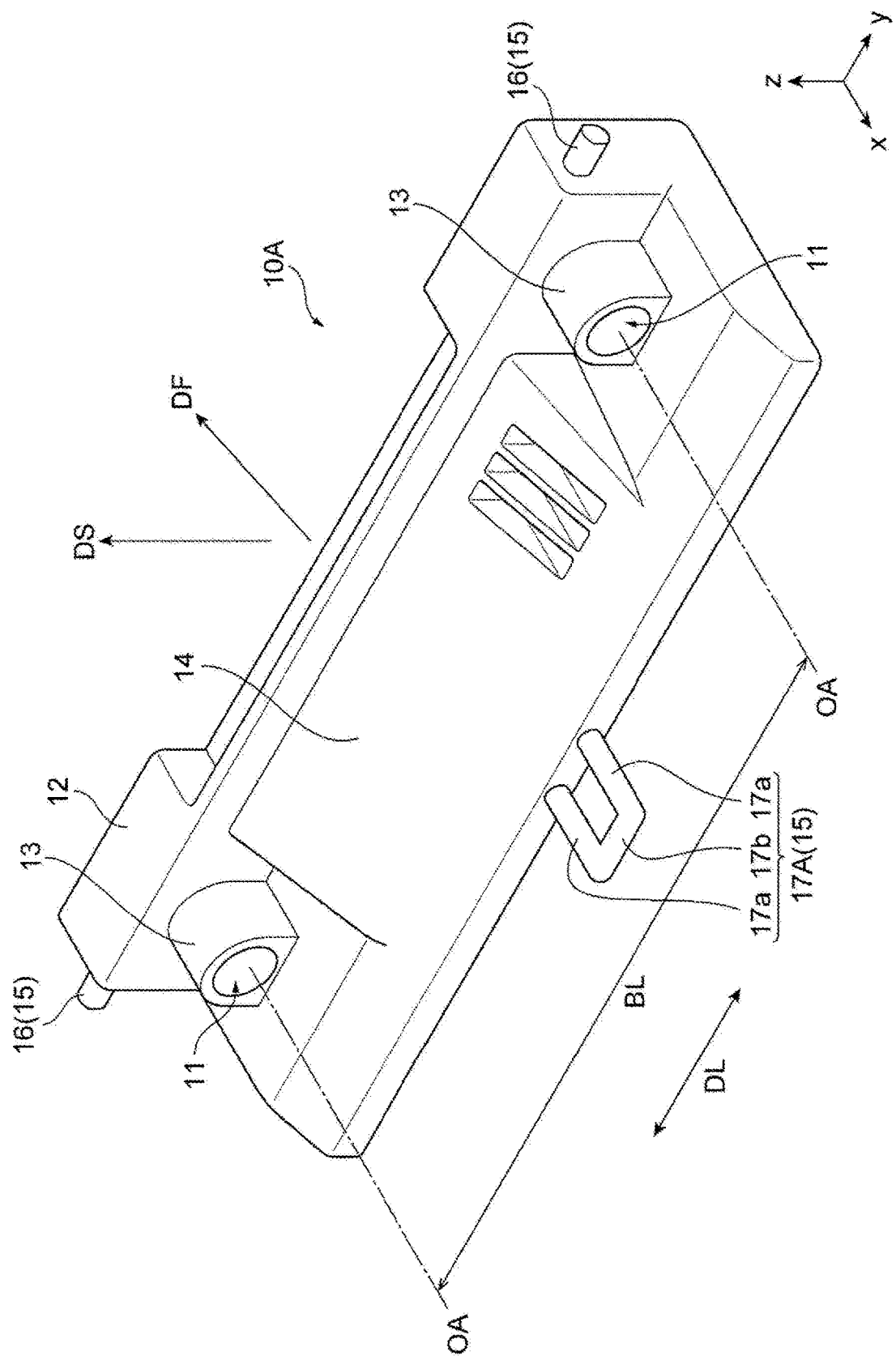
FIG. 10 is a top perspective view of the imaging unit of the imaging device illustrated in FIG. 9.
Figure 11:
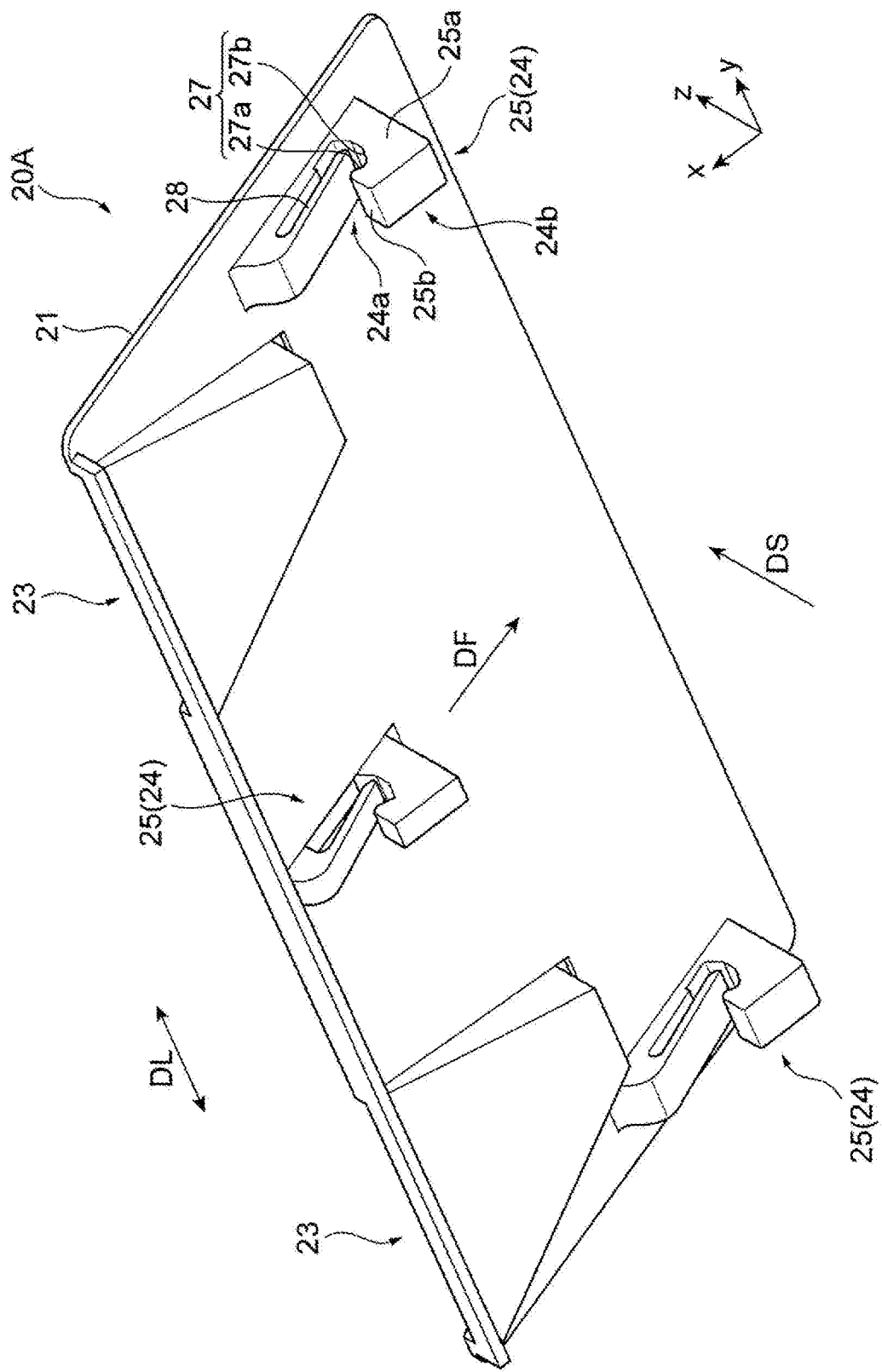
FIG. 11 is a bottom perspective view of the bracket of the imaging device illustrated in FIG. 9.

FIG. 9 is a side view of an imaging device 1A according to the second embodiment of the present invention. FIG. 10 is a top perspective view of an imaging unit 10A of the imaging device 1A illustrated in FIG. 9. FIG. 11 is a bottom perspective view of a bracket 20A of the imaging device 1A illustrated in FIG. 9.

The imaging device 1A of the present embodiment differs from the imaging device 1 of the first embodiment in that a second supported part 17A of the imaging unit 10A has a different configuration and that it includes the first support structure 25 instead of the second support structure 26 at the rear end portion of the bracket 20A in the mounting direction DF of the imaging unit 10A. Since the other configurations of the imaging device 1A of the present embodiment are similar to those of the imaging device 1 of the above-described first embodiment, the similar portions are denoted by the same reference numerals, and description is omitted.

As illustrated in FIGS. 9 and 10, the imaging unit 10A of the imaging device 1A of the present embodiment includes the second supported part 17A at a position being the rear end portion in the mounting direction DF and being the center portion in the longitudinal direction DL. The second supported part 17A includes: a pair of first portions 17a projecting rearward in the mounting direction DF from the center portion in the longitudinal direction DL of the imaging unit 10A; and a pillar-shaped second portion 17b provided at the rear end in the mounting direction DF of the pair of first portions 17a and extending in an axial direction along a direction perpendicular to the mounting direction DF and the support direction DS.

In the second supported part 17A, the pair of first portions 17a extends substantially in parallel to the direction of the optical axis OA of the imaging unit 10A and the roll axis (x-axis) of the vehicle, while the second portion 17b extends in the axial direction that is substantially perpendicular to the direction of the optical axis OA of the imaging unit 10A and substantially parallel to the pitch axis (y-axis) of the vehicle. The second supported part 17A has both end portions of the second portion 17b in the axial direction being connected to the rear end portions of the pair of first portions 17a in the mounting direction DF of the imaging unit 10A, and thus is shaped in approximately a U-shape in top view so as to be formed into an annular shape having an opening between the second supported part 17A and the housing 12 of the imaging unit 10A.

As illustrated in FIGS. 9 and 11, the plurality of support structures 24 of the bracket 20A of the imaging device 1A of the present embodiment includes three first support structures 25. The bracket 20A includes the pair of first support structures 25 at a position being a front end portion in the mounting direction DF of the imaging unit 10A and being both end portions in the longitudinal direction DL of the imaging unit 10A, and includes one first support structure 25 at a position being the rear end portion in the mounting direction DF of the imaging unit 10A and being the center portion in the longitudinal direction DL of the imaging unit 10A.

Figure 12:
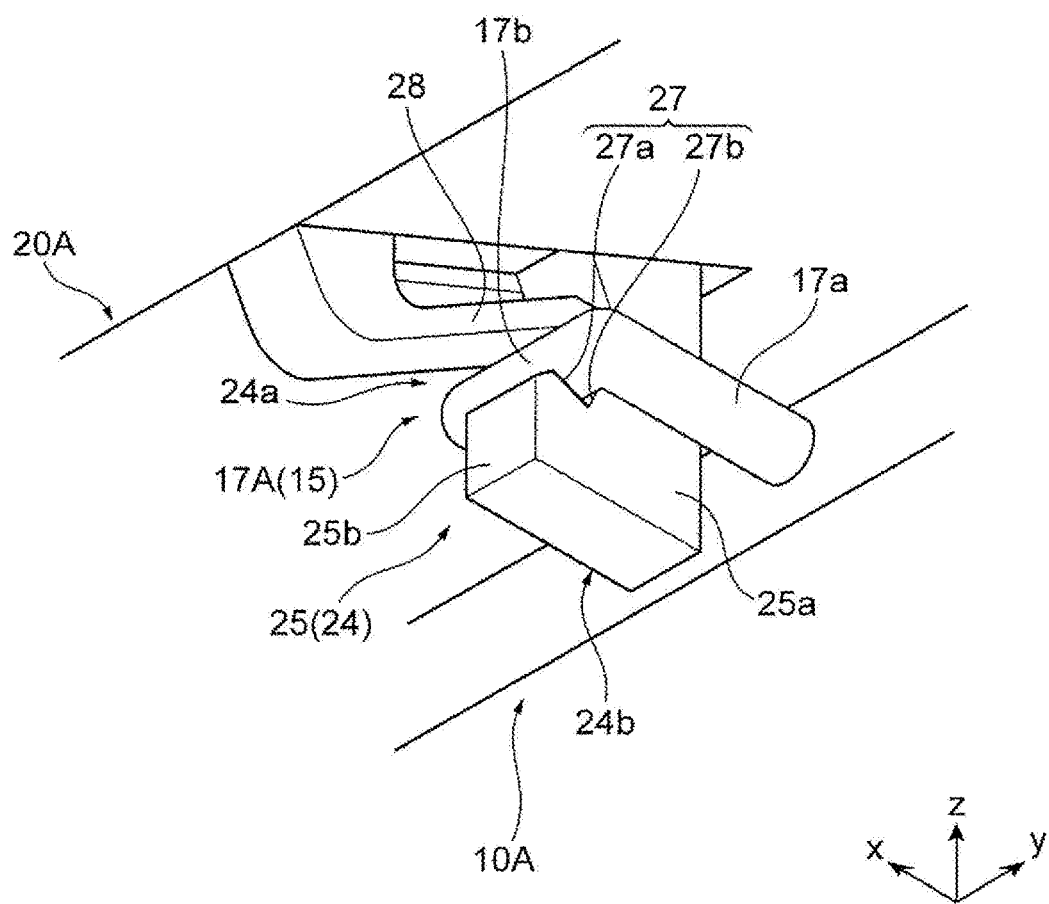
FIG. 12 is an enlarged view of a first support structure of the bracket illustrated in FIG. 11.

FIG. 12 is an enlarged view of the first support structure 25 provided at the rear end portion in the mounting direction DF of the imaging unit 10A of the bracket 20A illustrated in FIG. 11. Note that FIG. 12 illustrates a state in which the second supported part 17A of the imaging unit 10A is supported by the first support structure 25, as illustrated in FIG. 9. As illustrated in FIG. 12, according to the imaging device 1A of the present embodiment, the second supported part 17A of the imaging unit 10A is supported by the first support structure 25 provided at the rear end portion of the bracket 20A in the mounting direction DF of the imaging unit 10A, in a similar manner to the first supported part 16 of the imaging unit 10A.

Therefore, according to the imaging device 1A of the present embodiment, it is possible not merely to obtain the similar effect to that of the imaging device 1 of the first embodiment but also to support the second supported part 17A of the imaging unit 10A further stably and reliably by using the first support structure 25 provided at the rear end portion of the bracket 20A in the mounting direction DF of the imaging unit 10A.

Third Embodiment

Hereinafter, third embodiment of an imaging device of the present invention will be described with reference to FIGS. 13 to 15.

Figure 13:
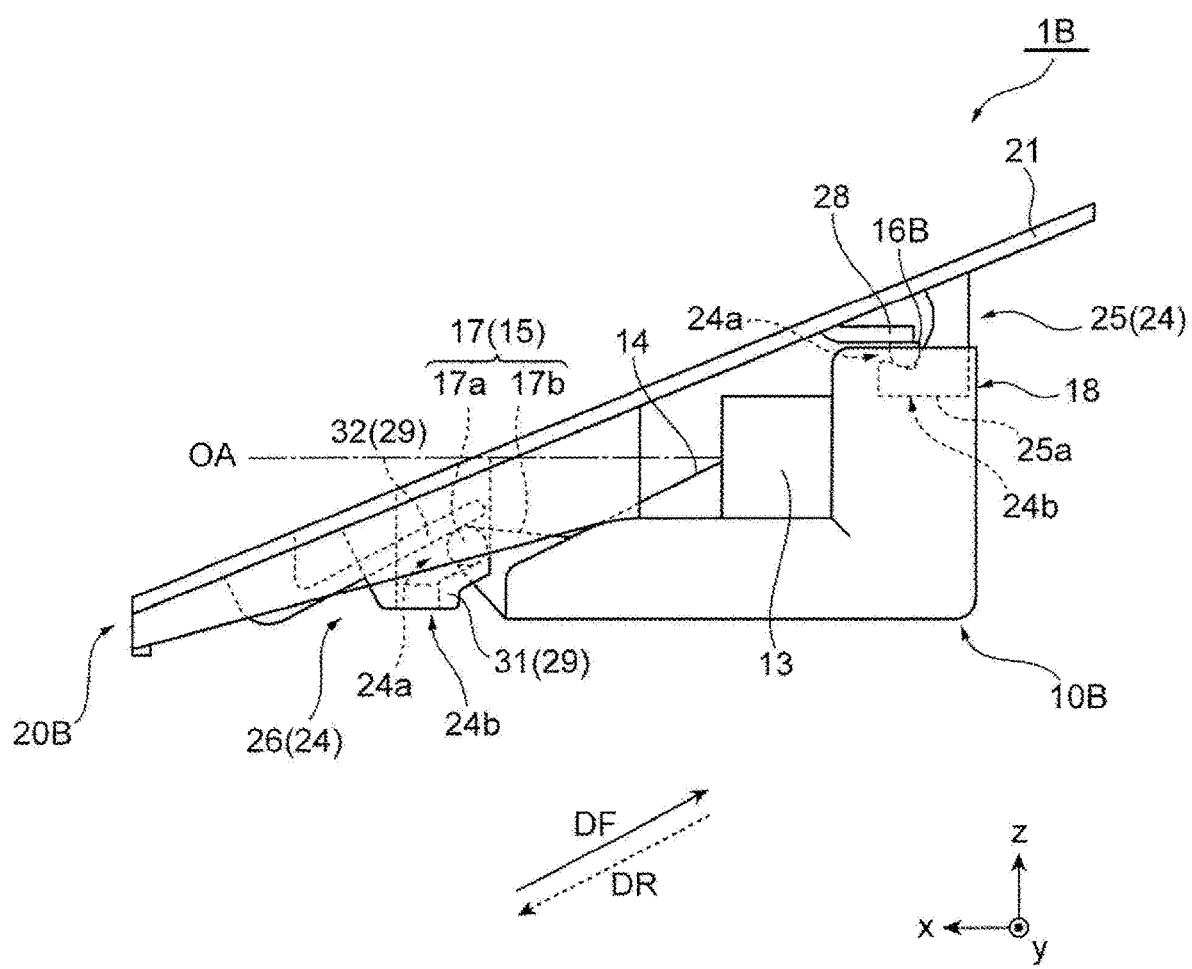
FIG. 13 is a side view of an imaging device according to a third embodiment of the present invention.

FIG. 13 is a side view of an imaging device 1B according to the third embodiment of the present invention. FIG. 14 is a top perspective view from of an imaging unit 10B of the imaging device 1B illustrated in FIG. 13. FIG. 15 is a bottom perspective view of a bracket 20B of the imaging device 1B illustrated in FIG. 13.

The imaging device 1B of the present embodiment is different from the imaging device 1 of the first embodiment in the configuration of a first supported part 16B of the imaging unit 10B. Since the other configurations of the imaging device 1B of the present embodiment are similar to those of the imaging device 1 of the above-described first embodiment, the same parts are denoted by the same reference numerals and description is omitted.

Figure 14:
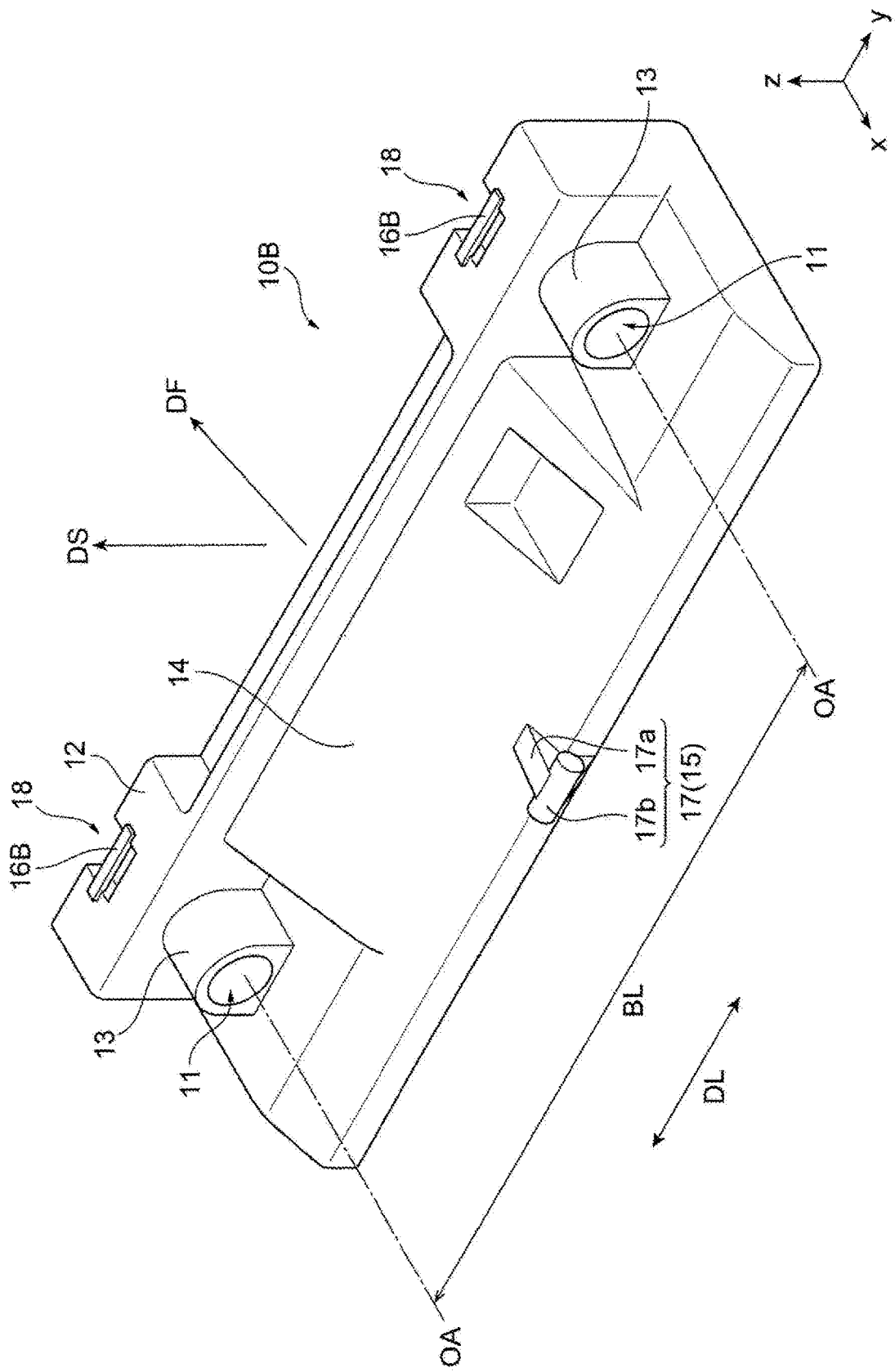
FIG. 14 is a top perspective view of the imaging unit of the imaging device illustrated in FIG. 13.
Figure 15:
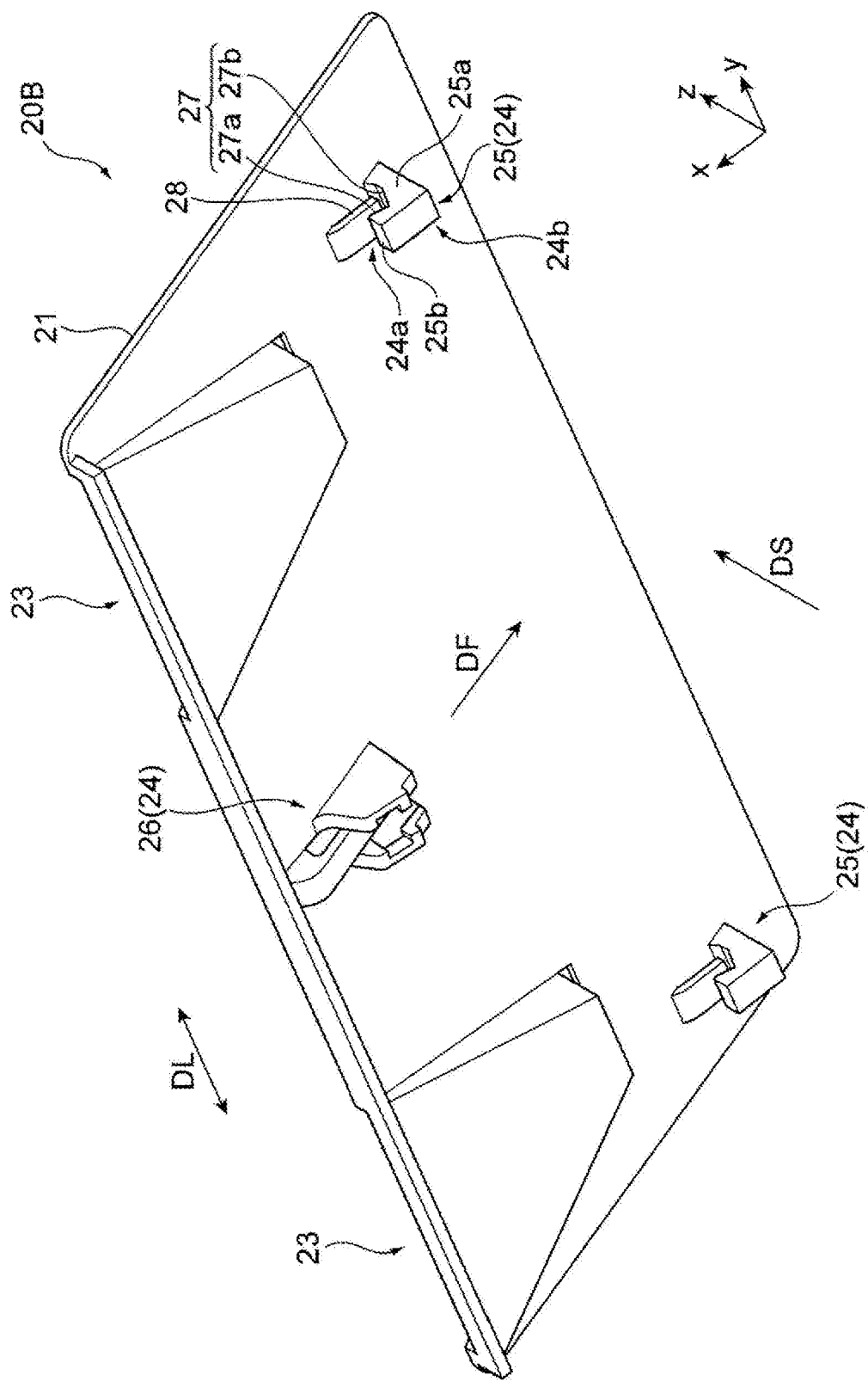
FIG. 15 is a bottom perspective view of the bracket of the imaging device illustrated in FIG. 13.

As illustrated in FIGS. 13 and 14, the imaging unit 10B of the imaging device 1B of the present embodiment includes a pair of recesses 18 for accommodating the lower end portion of the pair of first support structure 25 of the bracket 20B at a position being the front end portion of the housing 12 in the mounting direction DF and being both end portions in the longitudinal direction DL. The imaging unit 10B includes a pair of the first supported parts 16B extending over the pair of recesses 18 on an end surface on the upper side of the housing 12 in the support direction DS.

The first supported part 16B of the imaging unit 10B is has a pillar shape having the longitudinal direction DL of the imaging unit 10B as its axial direction, with both end portions in the axial direction fixed to the housing 12. As illustrated in FIG. 13, the first supported part 16B has a semicircular pillar shape having a flat surface supported by the guide part 28 of the first support structure 25 of the bracket 20B. The pair of first support structures 25 of the bracket 20B is more miniaturized than the pair of first support structures 25 provided in the bracket 20 of the imaging device 1 of the first embodiment illustrated in FIG. 5, facilitating accommodation of its lower end portion into the recess 18 of the housing 12 of the imaging unit 10B.

According to the imaging device 1B of the present embodiment, it is not merely possible to achieve the similar effect to that of the imaging device 1 of the first embodiment described above, but also possible to suppress projection of the pair of first supported parts 16B of the imaging unit 10B in the longitudinal direction DL of the imaging unit 10B, enabling arranging the pair of first support structures 25 of the bracket 20B on an inner side of the both ends of the imaging unit 10B in the longitudinal direction DL. This makes it possible to achieve miniaturization and weight reduction of the imaging device 1B.

Embodiments of the present invention have been described in detail with reference to the drawings as above. The specific configuration is not limited to the embodiments, and design changes or the like within the scope not deviating from the scope and spirit of the present invention are to be included in the present invention.

REFERENCE SIGNS LIST

1 Imaging device
1A Imaging device
1B Imaging device
10 imaging unit
10A imaging unit
10B imaging unit
15 supported part
16 first supported part
17 second supported part
17A second supported part
17a first portion
17b second portion
20 bracket
20A bracket
20B bracket
24 support structure
24a receiving port
24b support
25 first support structure
25a engagement part
25b guide surface
26 second support structure
27 engagement recess
27a inclined surface
27b inclined surface
28 guide part
29 pair of guide parts
30 guide wall
30a first guide surface
30b second guide surface
30c inlet
31 first guide part
32 second guide part
DF mounting direction
DL longitudinal direction
DS support direction
OA optical axis
WS windshield

The invention claimed is:

1. An imaging device comprising:
an imaging unit; and
a bracket capable of mounting the imaging unit in a mounting direction,
wherein the imaging unit includes a plurality of supported parts supported by the bracket,
the bracket includes a plurality of support structures for supporting the plurality of supported parts, and
the plurality of support structures include:
a receiving port that opens toward a rear in the mounting direction to receive one of the plurality of supported parts in the mounting direction; and
a support for supporting the one of the plurality of supported parts on the forward side in the mounting direction of the receiving port from a support direction that intersects the mounting direction, wherein
the plurality of support structures includes at least one first support structure,
the first support structure is configured such that the support includes: an engagement recess provided in a recessed shape in the support direction to engage the one of the plurality of supported parts; and a guide part extending from a rear side to a front side of the receiving port in the mounting direction,
the plurality of support structures includes at least one second support structure,
the second support structure is configured such that the support includes a pair of guide parts including a first guide part and a second guide part, which are configured to oppose the support direction and extending from the rear side to the forward side of the receiving port in the mounting direction,
the imaging unit has a maximum dimension in a longitudinal direction intersecting the mounting direction and the support direction,
the second support structure includes a pair of guide walls opposing in the longitudinal direction and extending in an up-down direction,
the first guide part is provided on each of the pair of guide walls,
the second guide part is disposed between the pair of guide walls, and
the guide wall includes:
a first guide surface extending in the up-down direction from below the receiving port to the receiving port;
a second guide surface opposed to a rear side in the mounting direction and extending in the up-down direction; and
an inlet that opens downward between the first guide surface and the second guide surface to upwardly receive the one of the plurality of supported parts of the imaging unit.

2. The imaging device according to claim 1, wherein
the imaging unit is configured such that the plurality of supported parts includes: a pair of first supported parts provided at a position being a front end portion in the mounting direction and being both end portions in the longitudinal direction; and at least one second supported part at a position being a rear end portion in the mounting direction and being a center portion in the longitudinal direction, and
the plurality of support structures consists of: a pair of the first support structures that supports the pair of first supported parts; and the at least one second support structure that supports the at least one second supported part.

3. The imaging device according to claim 1,
wherein the support direction is the up-down direction, the engagement recess supports the one of the plurality of supported parts from below, and
one of the first guide part or the second guide part supports the one of the plurality of supported parts from above.

4. The imaging device according to claim 3,
wherein the engagement recess includes, at a rear end portion in the mounting direction, an inclined surface inclined rearward in the mounting direction with respect to the support direction.

5. The imaging device according to claim 4,
wherein the engagement recess includes, at a front end portion in the mounting direction, an inclined surface inclined forward in the mounting direction with respect to the support direction.

6. The imaging device according to claim 3,
wherein one of the first guide part or the second guide part has a rear end portion in the mounting direction defined as a fixed end, a front end portion in the mounting direction defined as a free end, and uses the front end portion to bias the supported part toward the engagement recess.

7. The imaging device according to claim 3,
wherein the plurality of support structures include an engagement part extending downward from above the guide part in the support direction on the forward side of the guide part in the mounting direction, and the engagement part includes: the engagement recess provided at a lower end portion in the support direction; and a guide surface extending from below the receiving port to the receiving port in the support direction.

8. The imaging device according to claim 1,
wherein the second guide part has a rear end portion in the mounting direction defined as a fixed end, a front end portion in the mounting direction defined as a free end, and uses the front end portion to bias the supported part toward the first guide part.

9. The imaging device according to claim 1,
wherein the plurality of supported parts of the imaging unit has a pillar shape extending in an axial direction along a direction perpendicular to the mounting direction and the support direction.

10. The imaging device according to claim 2,
wherein the second supported part includes: a first portion projecting rearward in the mounting direction from a center portion in the longitudinal direction of the imaging unit; and a pillar-shaped second portion provided at a rear end of the first portion in the mounting direction and extending in an axial direction along a direction perpendicular to the mounting direction and the support direction.

11. The imaging device according to claim 1,
wherein the mounting direction is a direction along inclination of a windshield of a vehicle intersecting the support direction and an optical axis direction of the imaging unit.

* * * * *